Jan. 12, 1932.　　　M. GARBELL　　　1,841,113
TYPEWRITING MACHINE
Filed Dec. 10, 1927　　　19 Sheets-Sheet 1
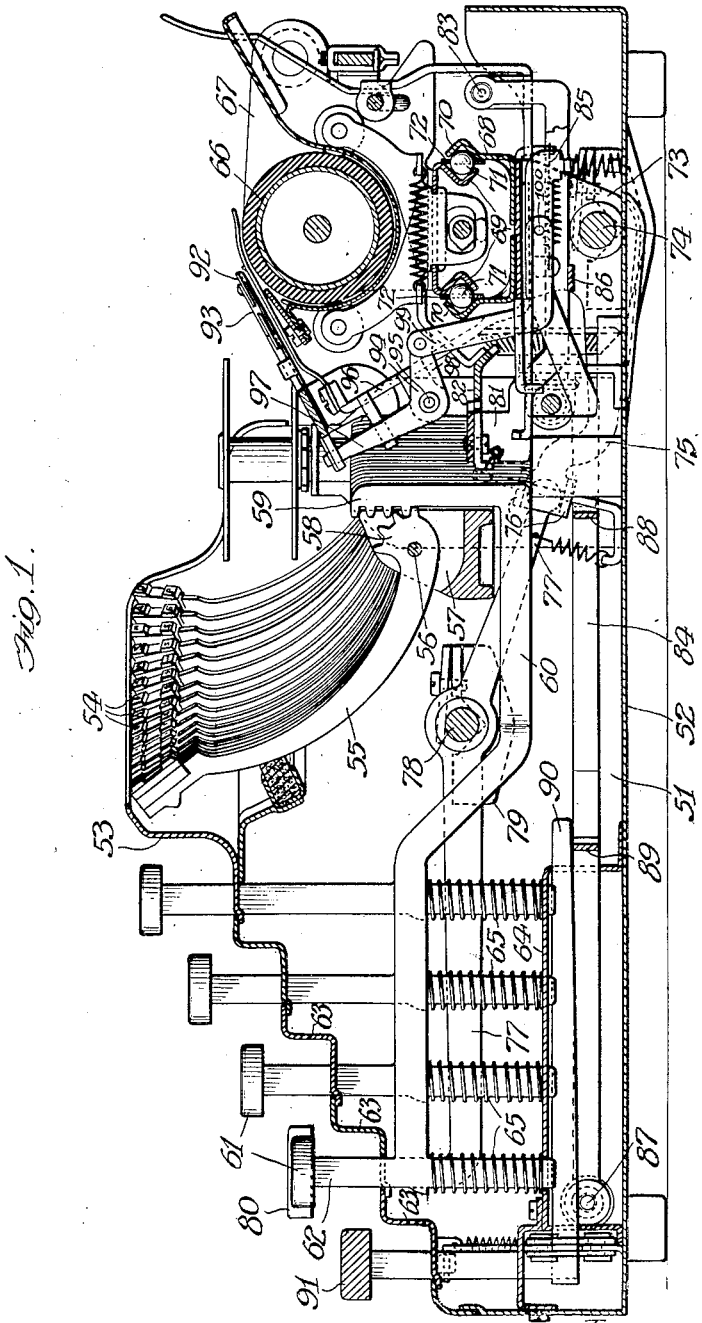
Inventor
Max Garbell
By Jones, Addington, Ames & Seibold
Attys Jan. 12, 1932.   M. GARBELL   1,841,113
TYPEWRITING MACHINE
Filed Dec. 10, 1927   19 Sheets-Sheet 2
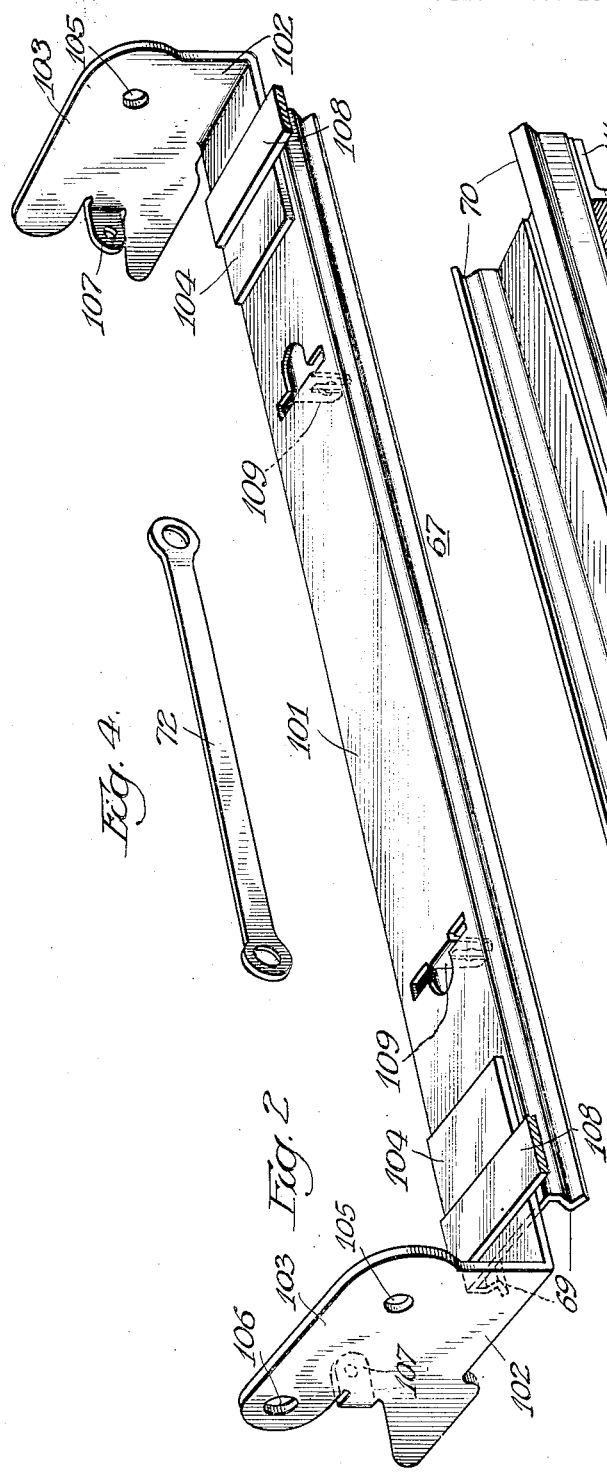
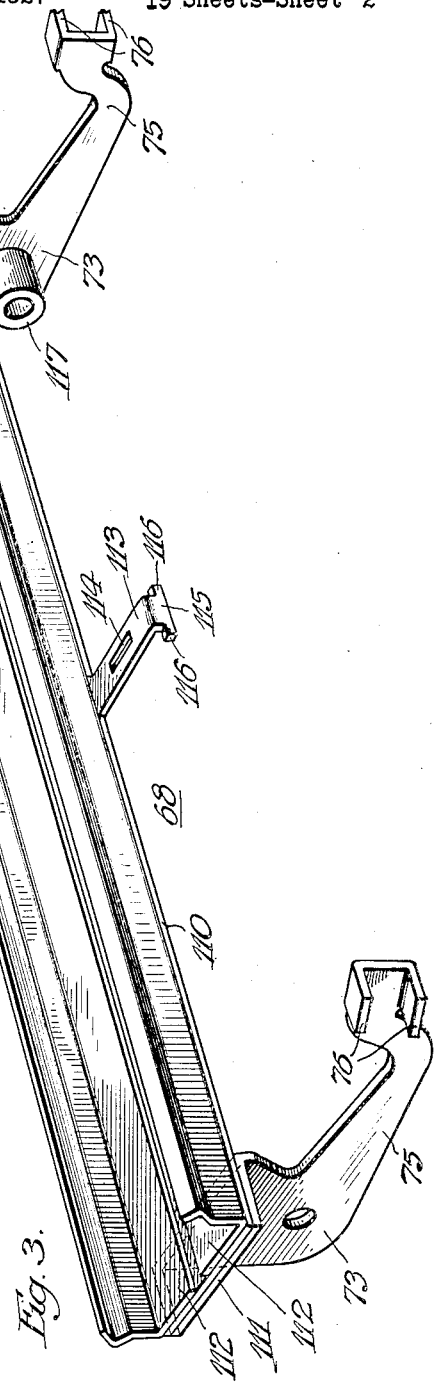
Inventor
Max Garbell
By Jones, Addington,
Ames + Seibold Attys

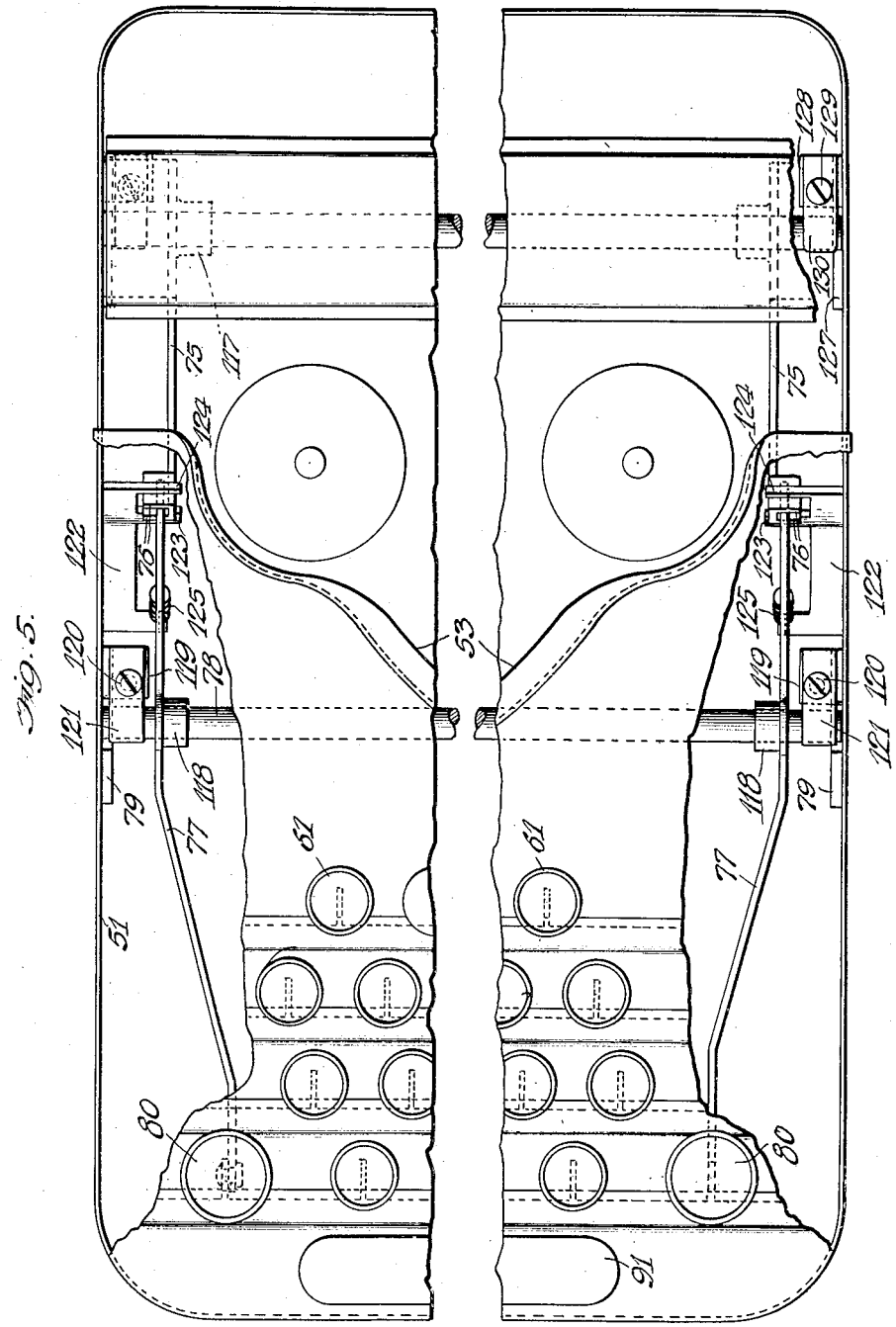

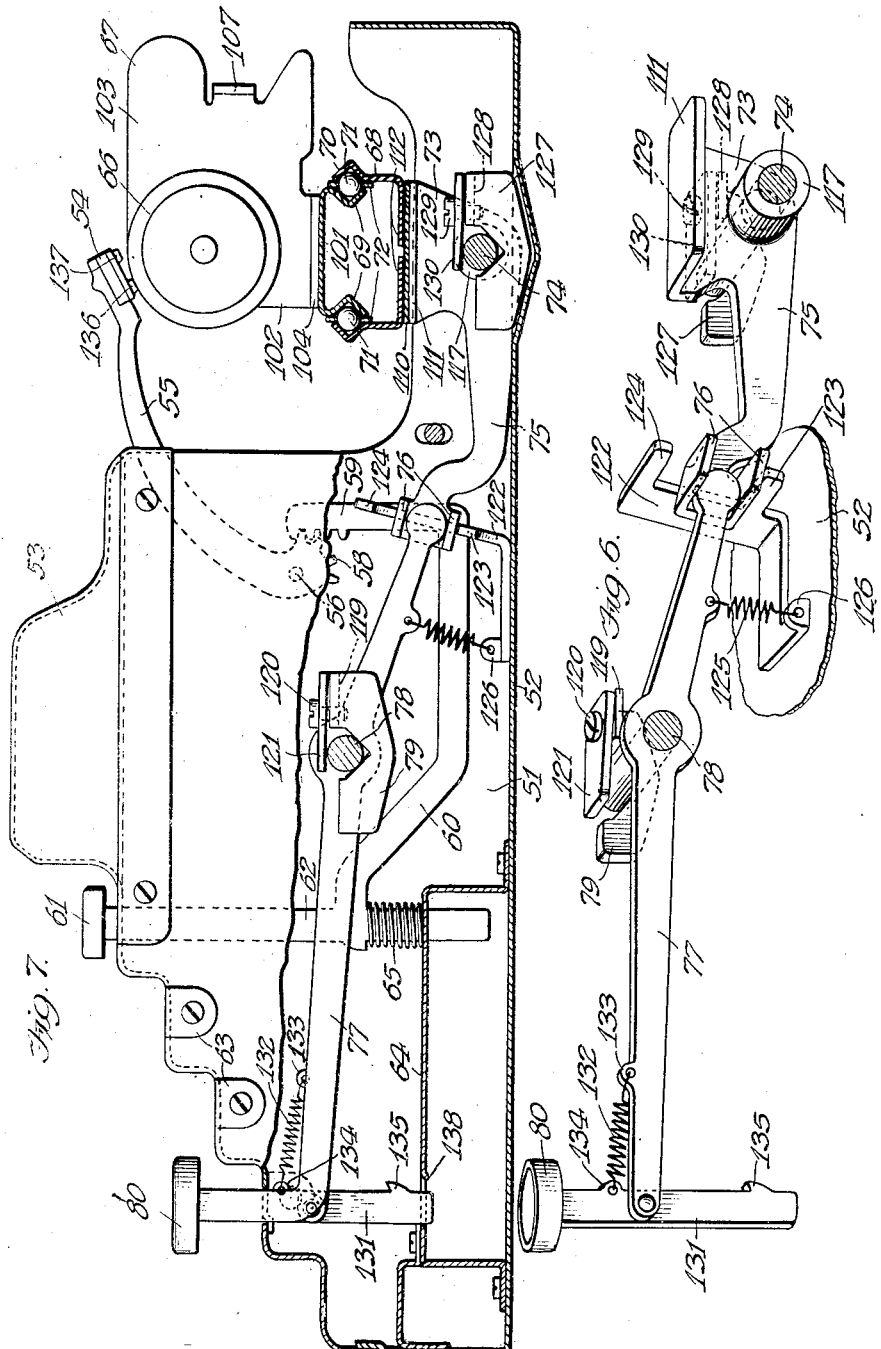

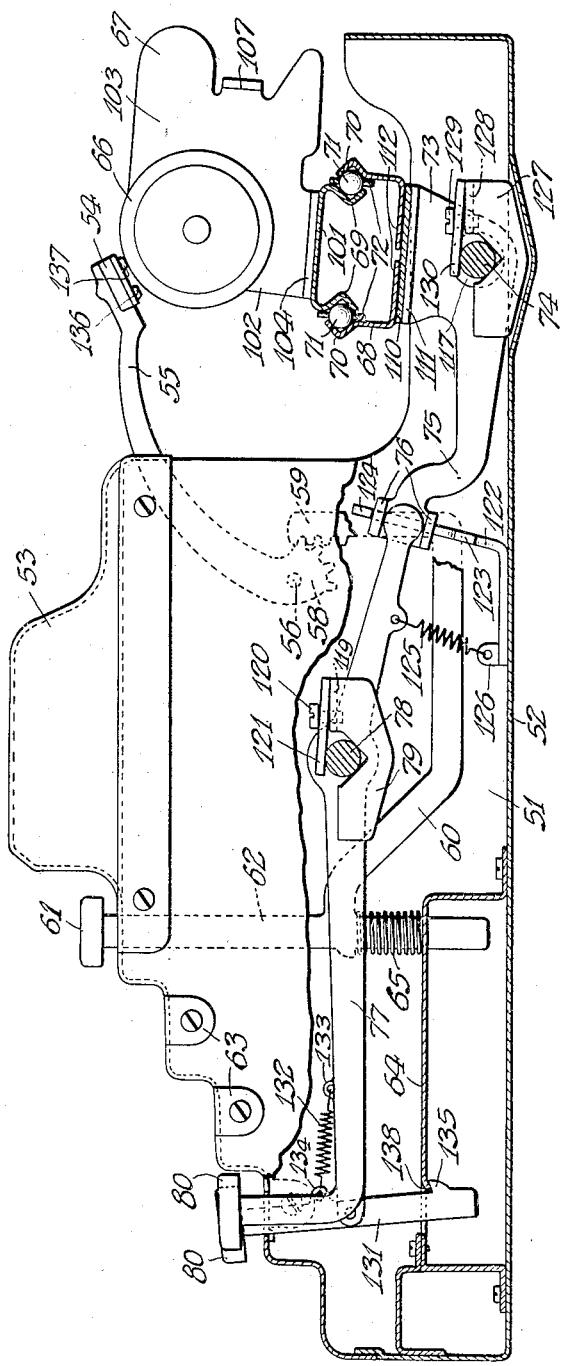

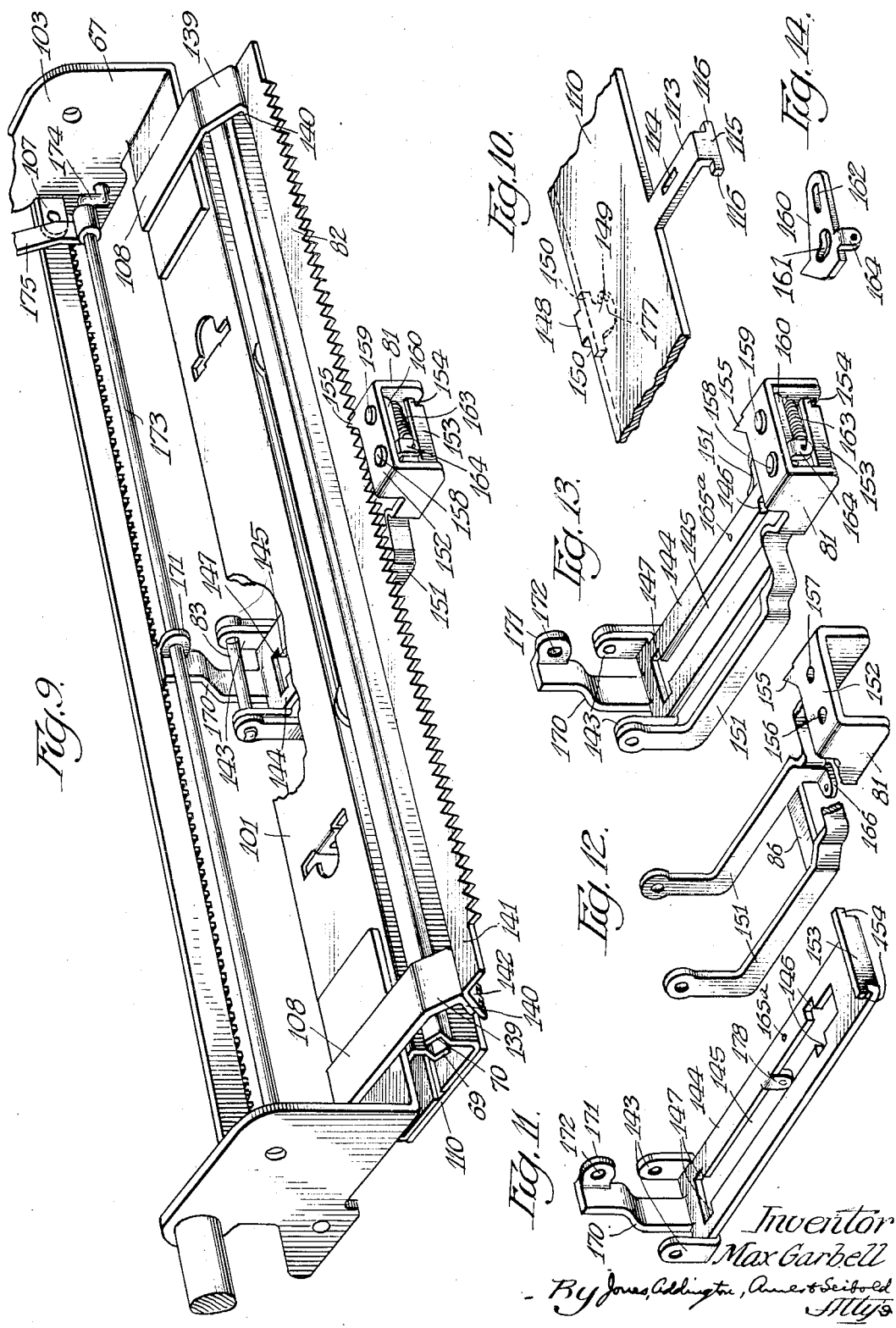

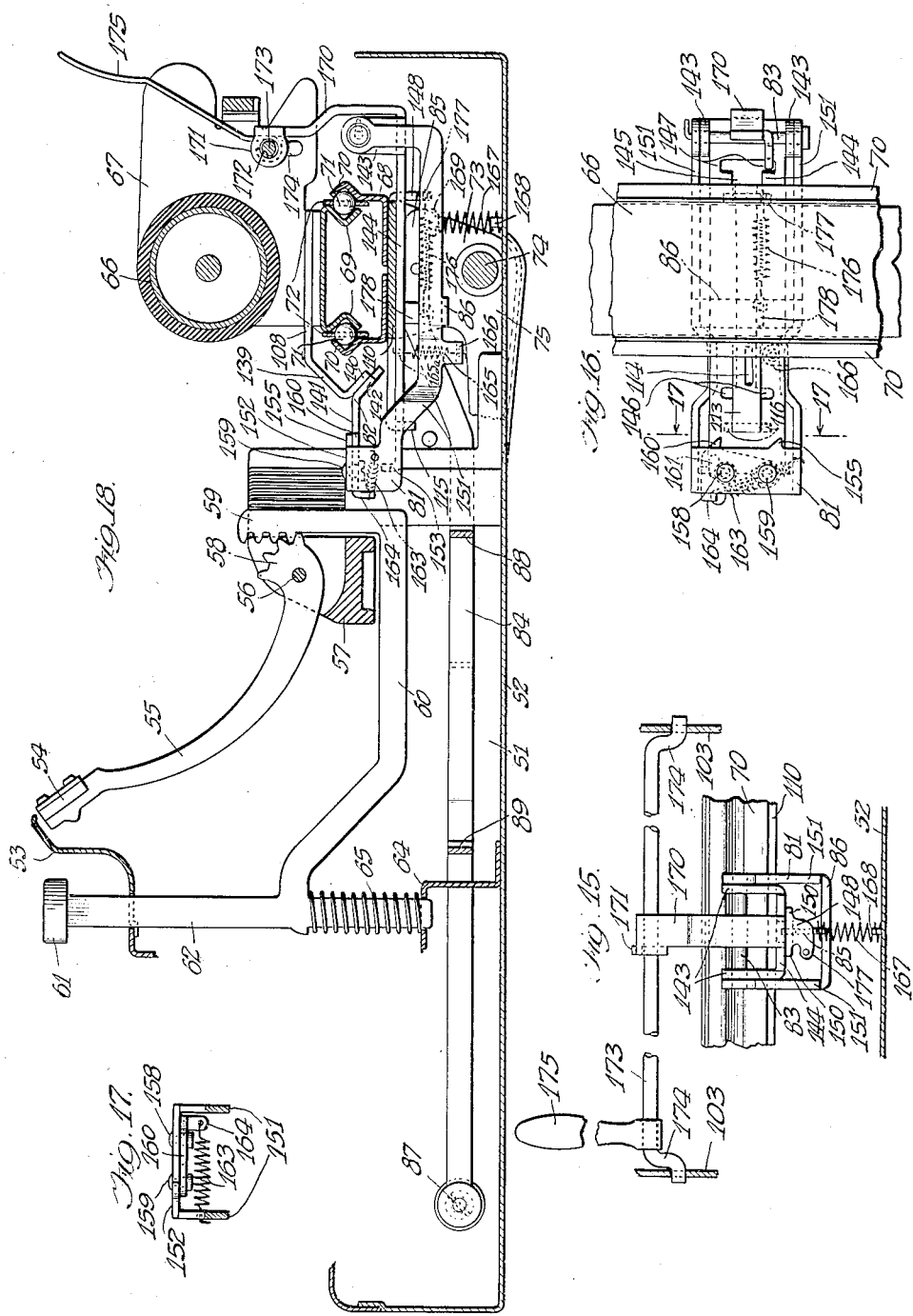

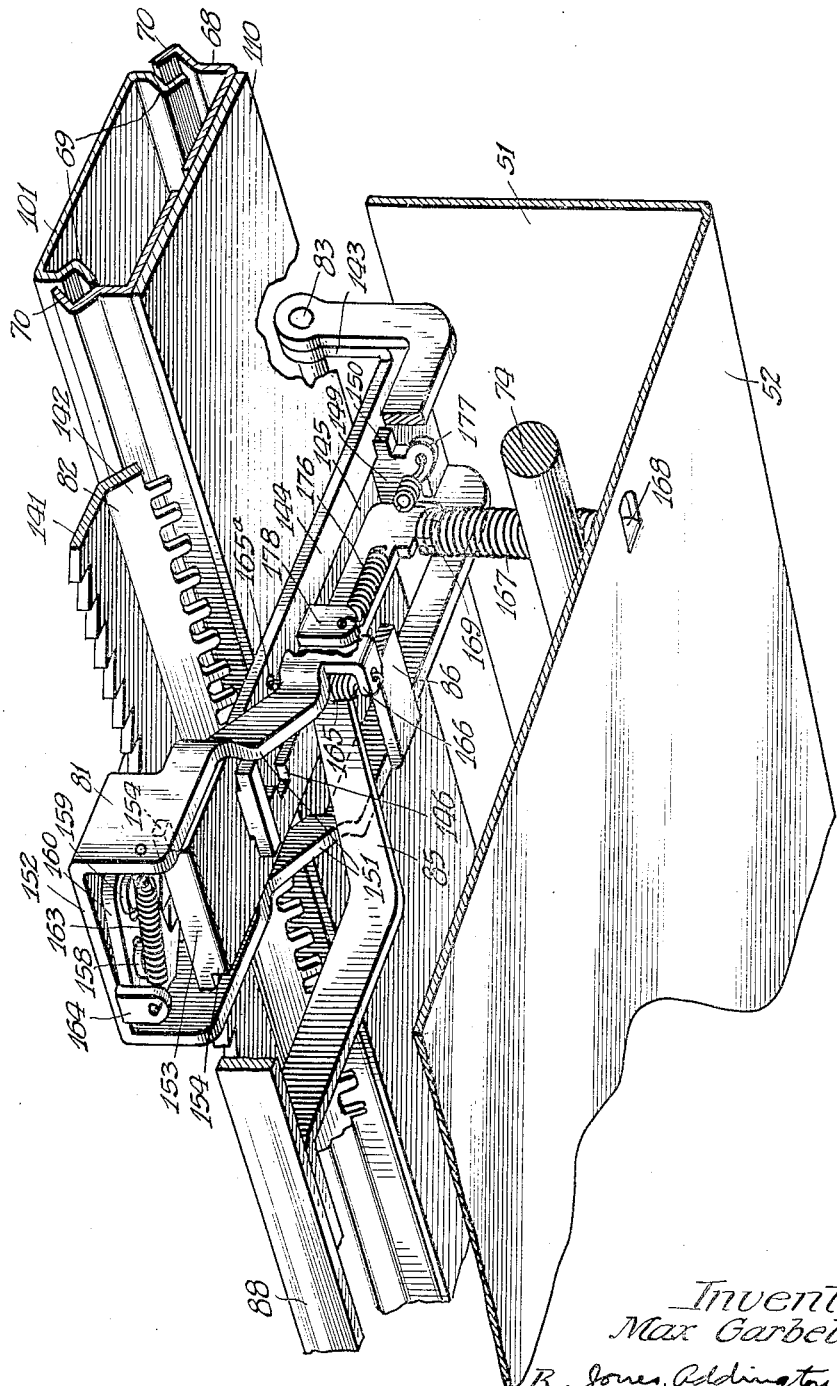

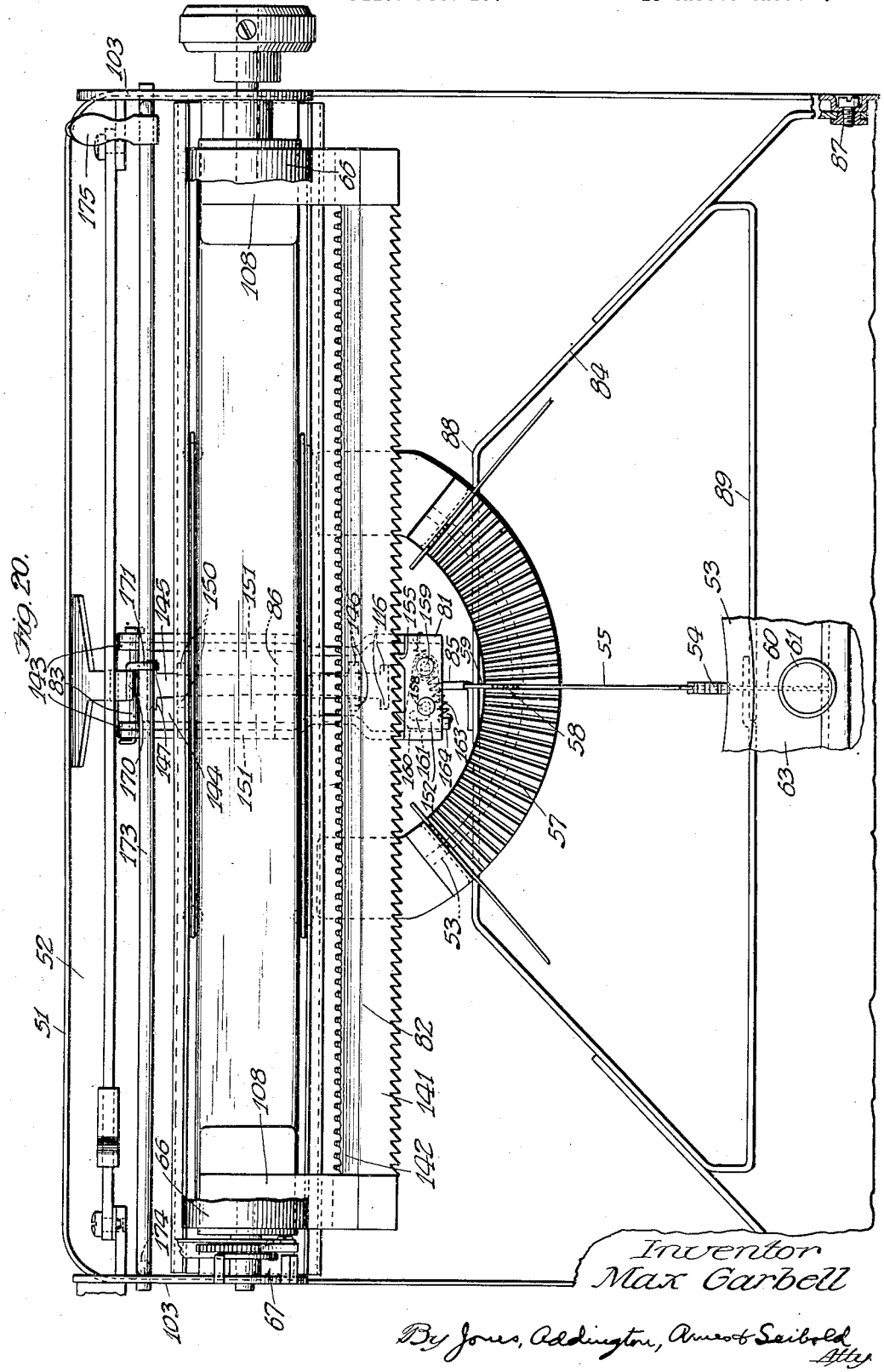

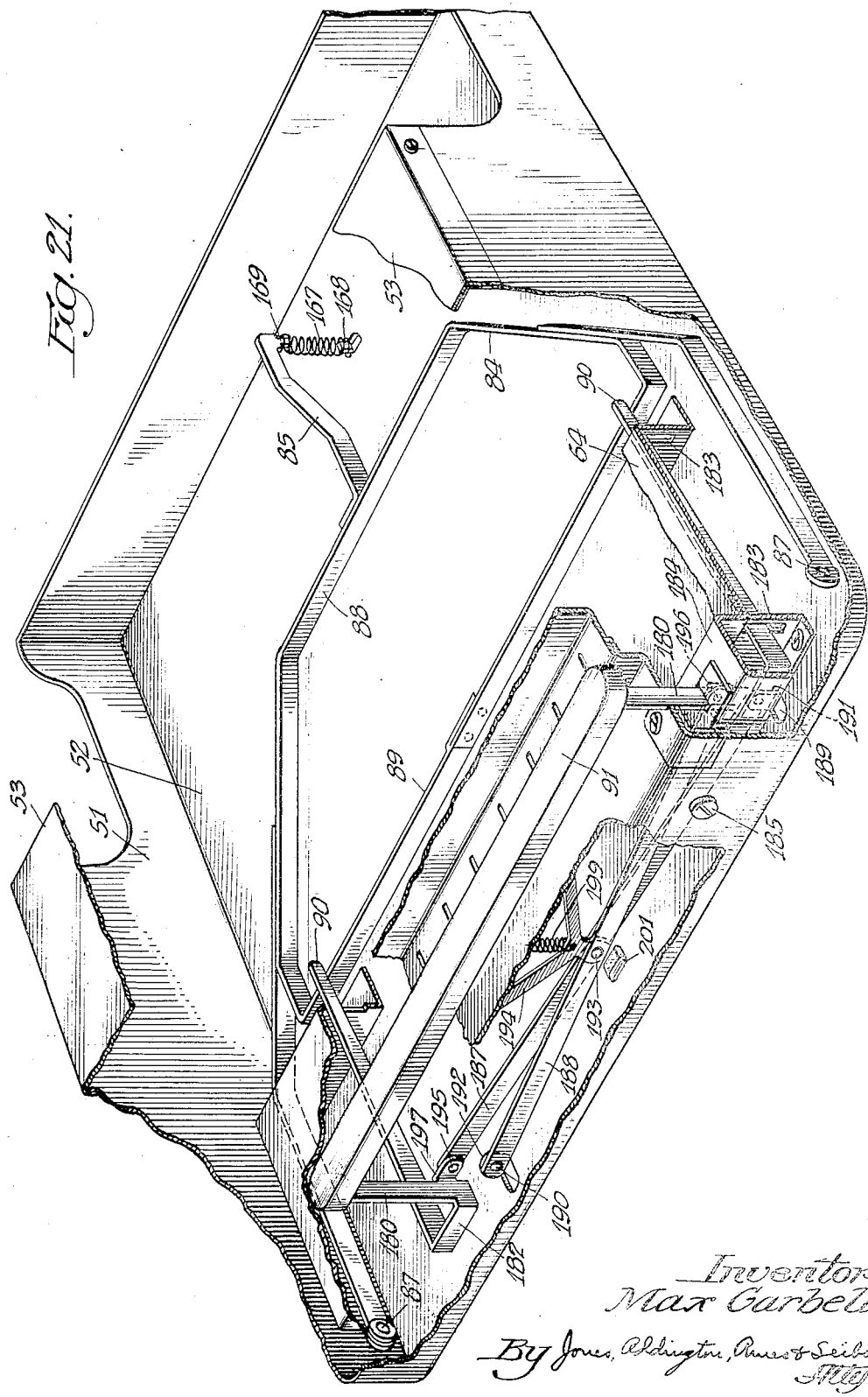

Jan. 12, 1932.  M. GARBELL  1,841,113
TYPEWRITING MACHINE
Filed Dec. 10, 1927   19 Sheets-Sheet 11
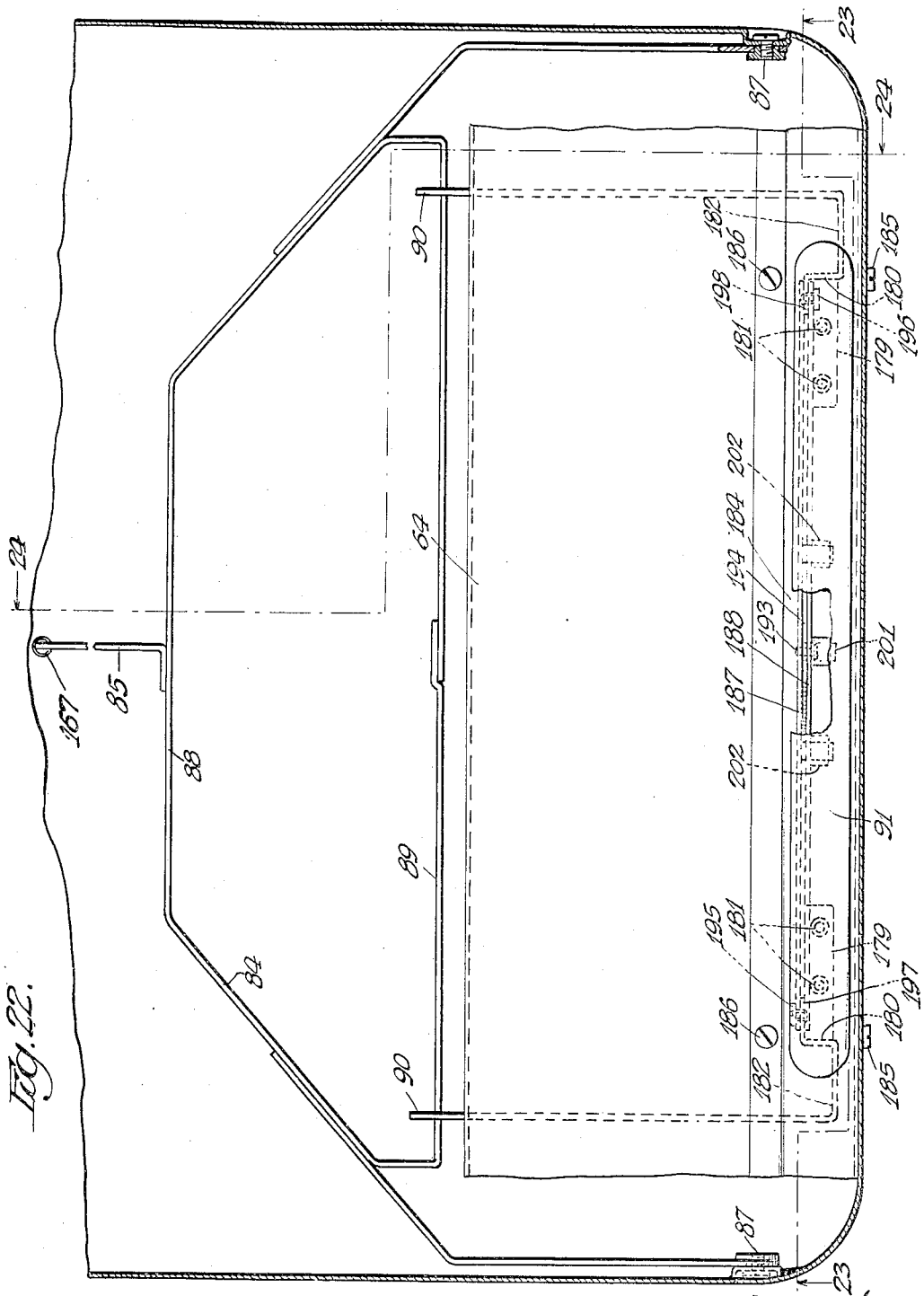

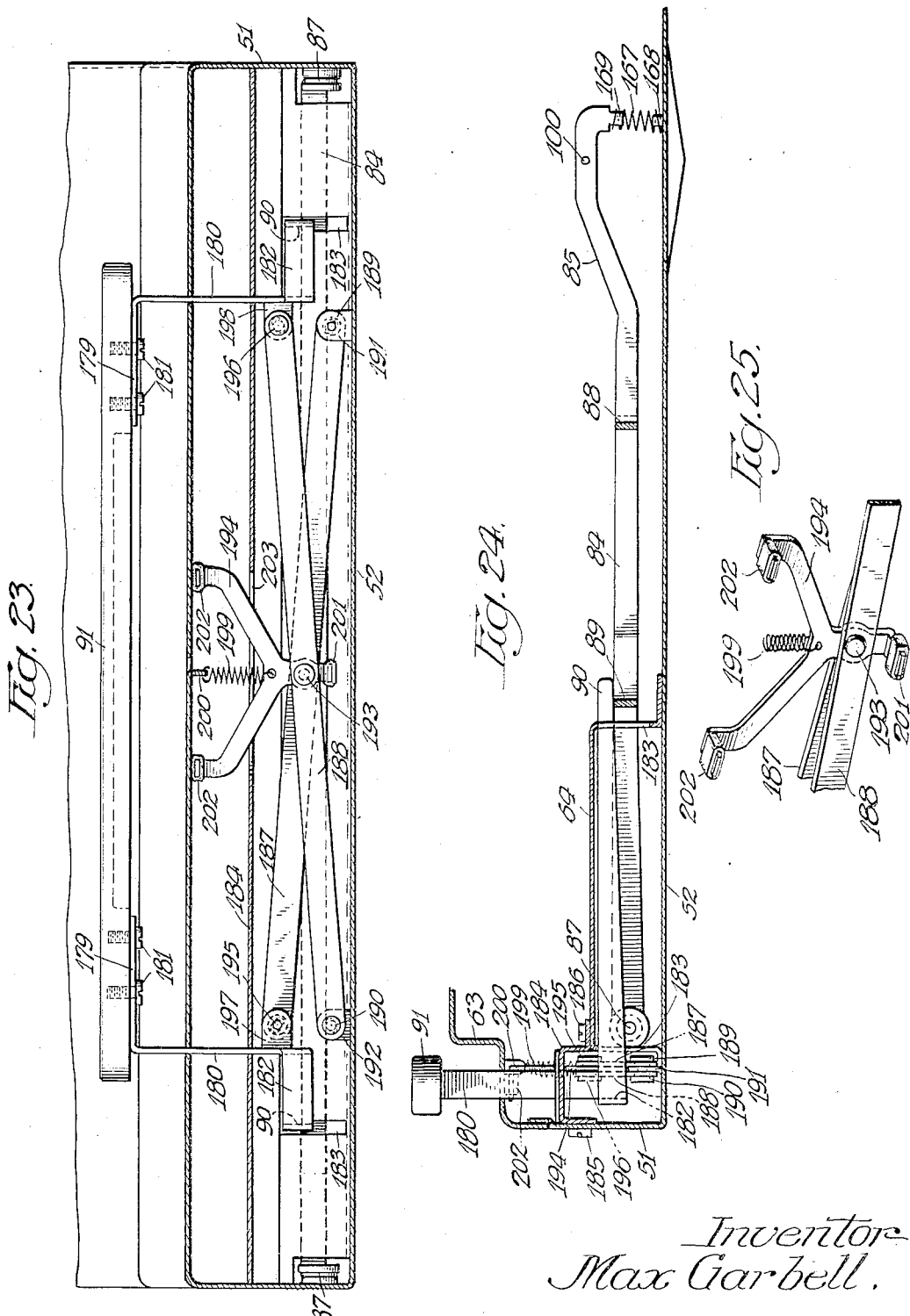

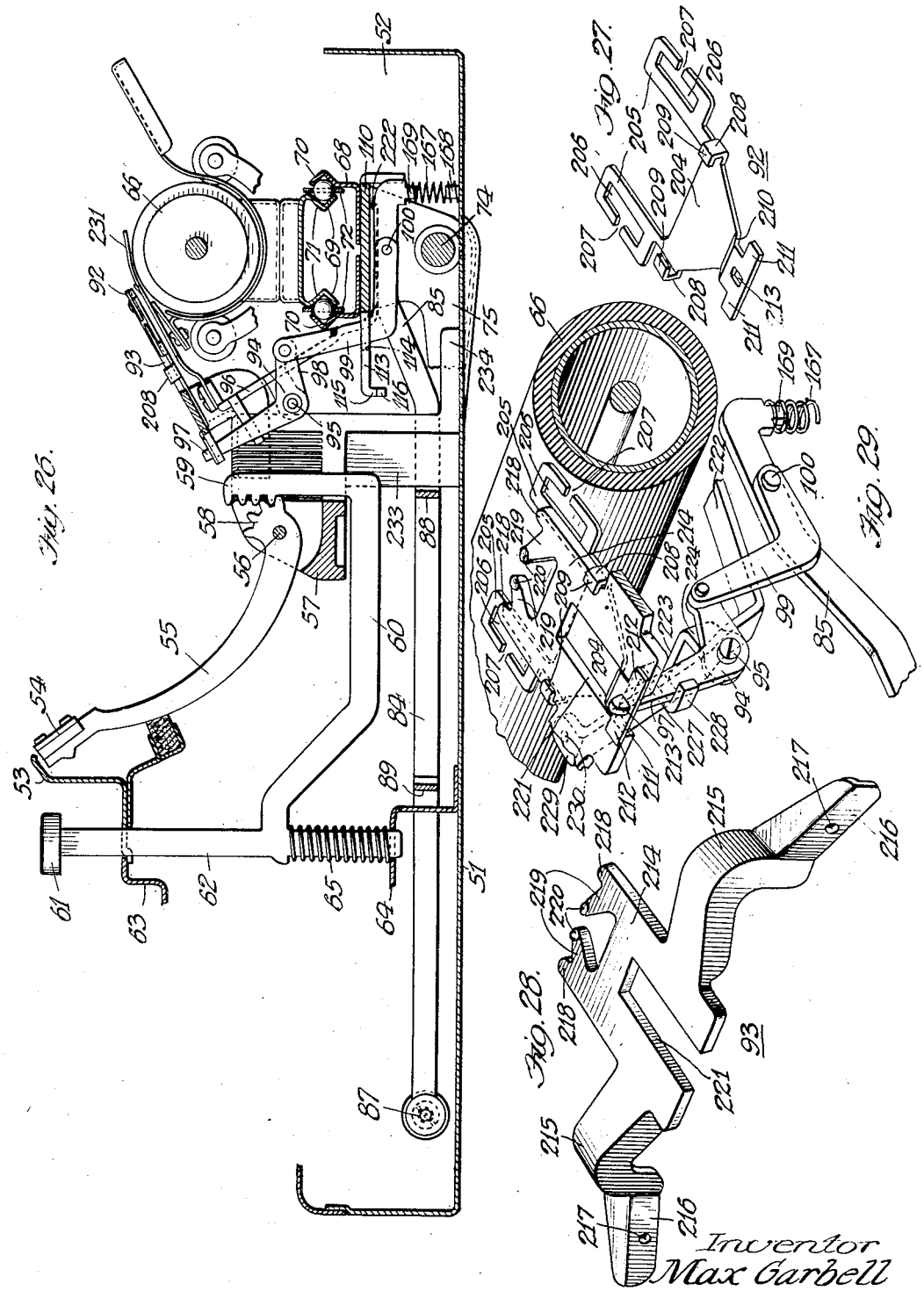

Jan. 12, 1932.  M. GARBELL  1,841,113
TYPEWRITING MACHINE
Filed Dec. 10, 1927  19 Sheets-Sheet 14
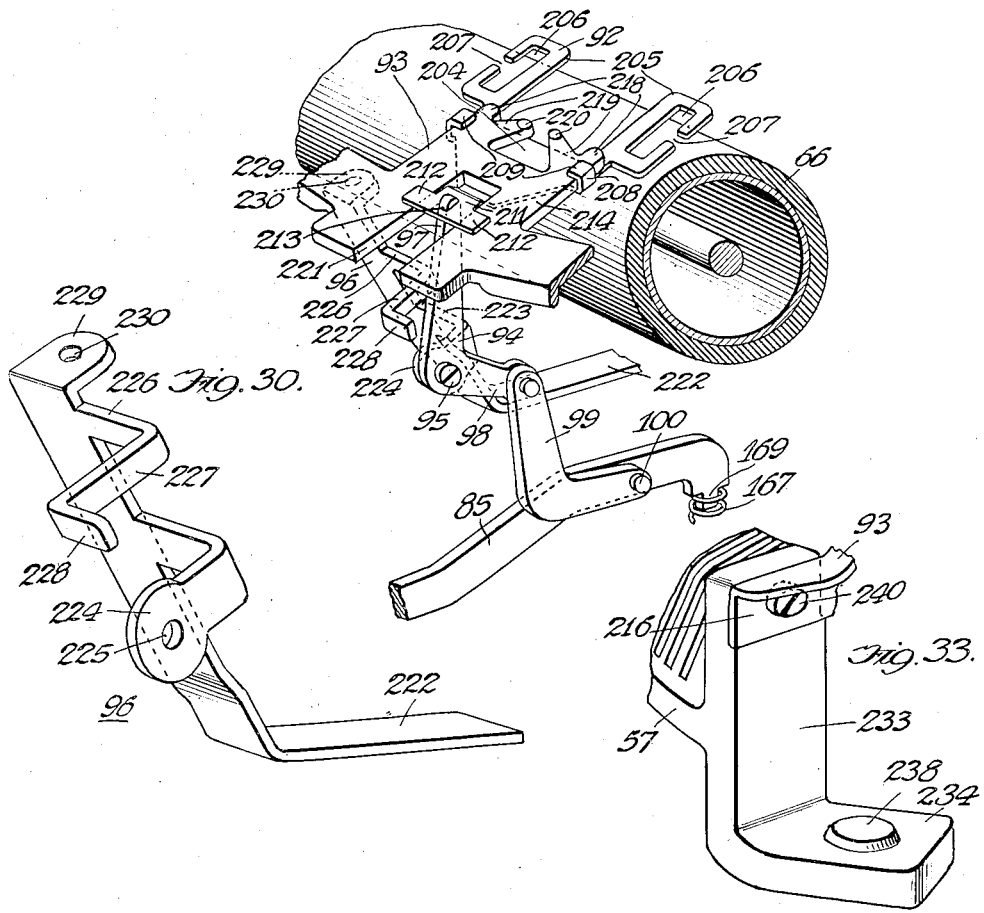
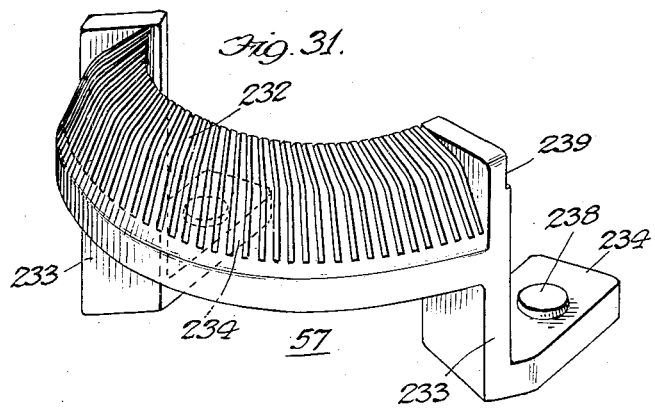
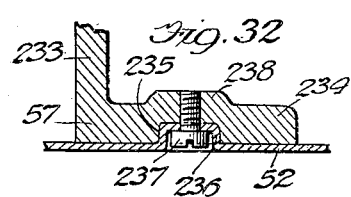

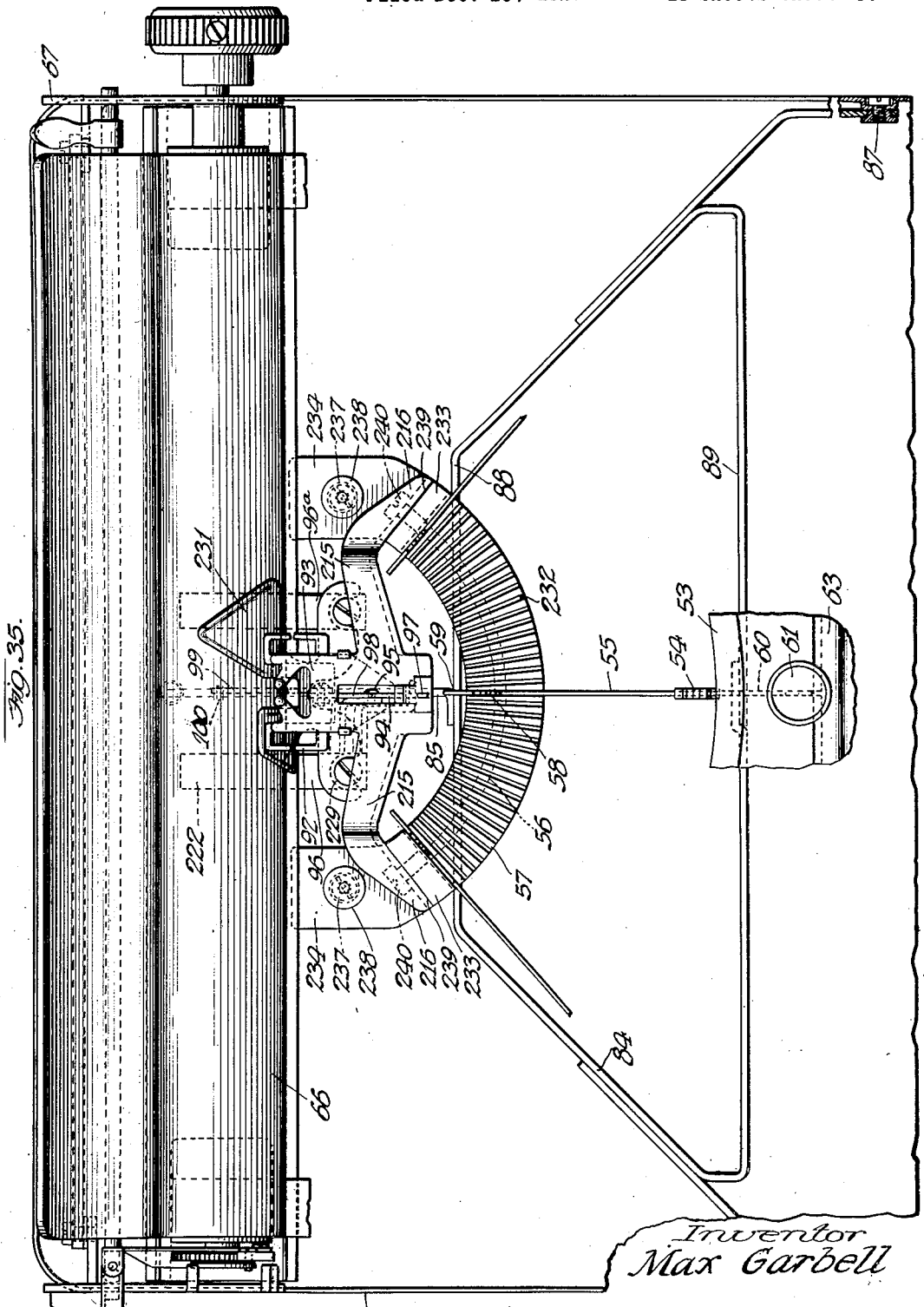

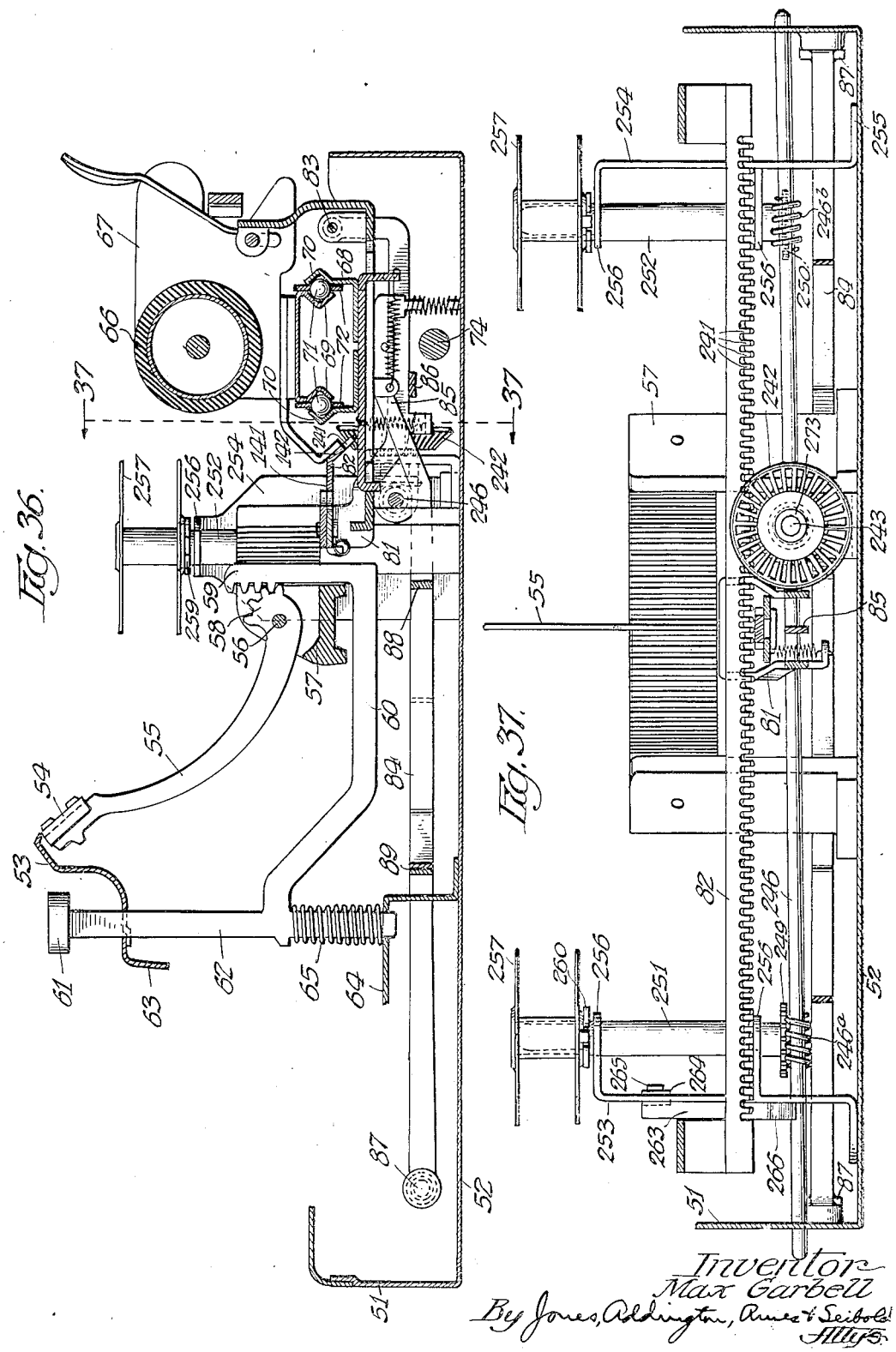

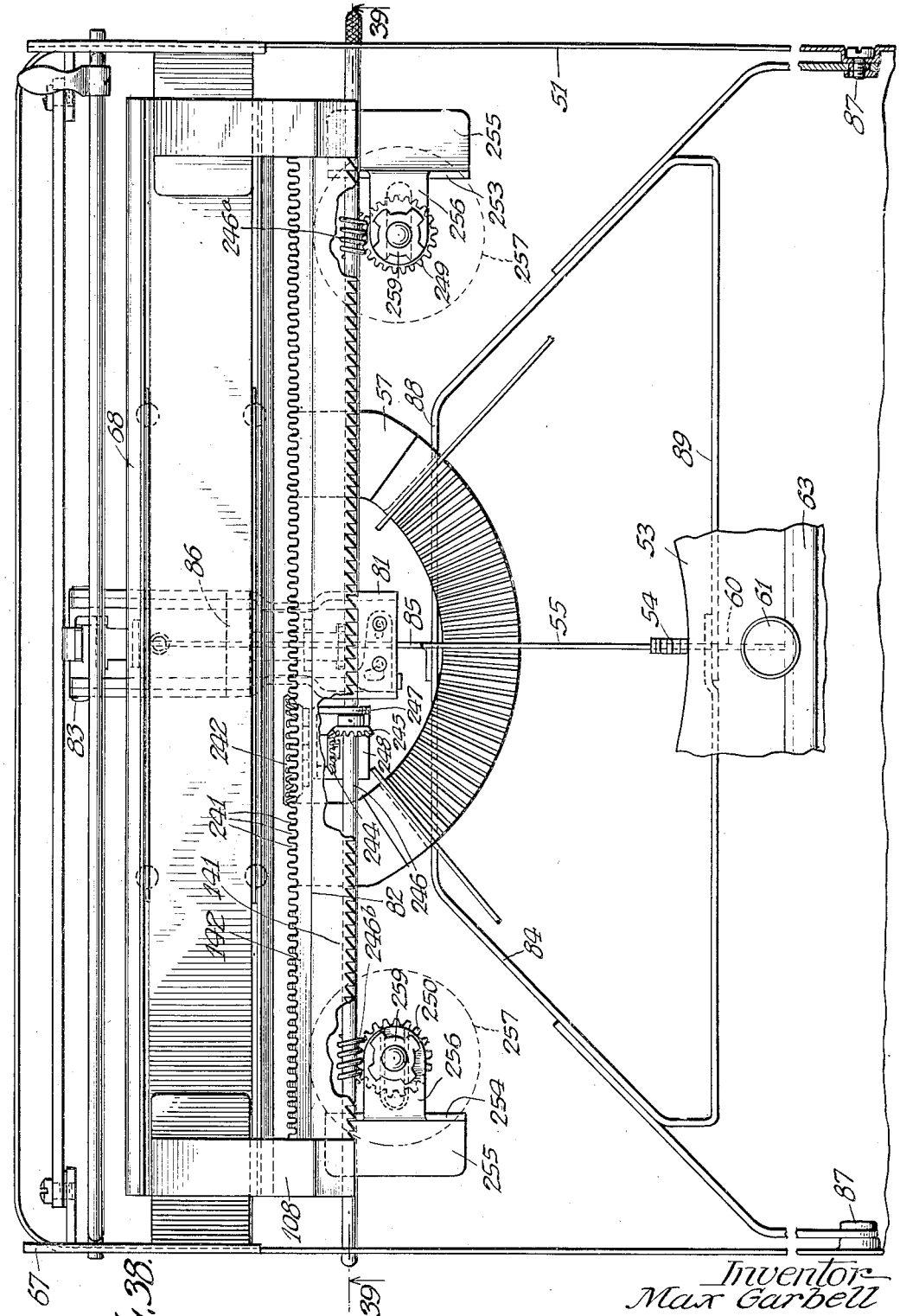

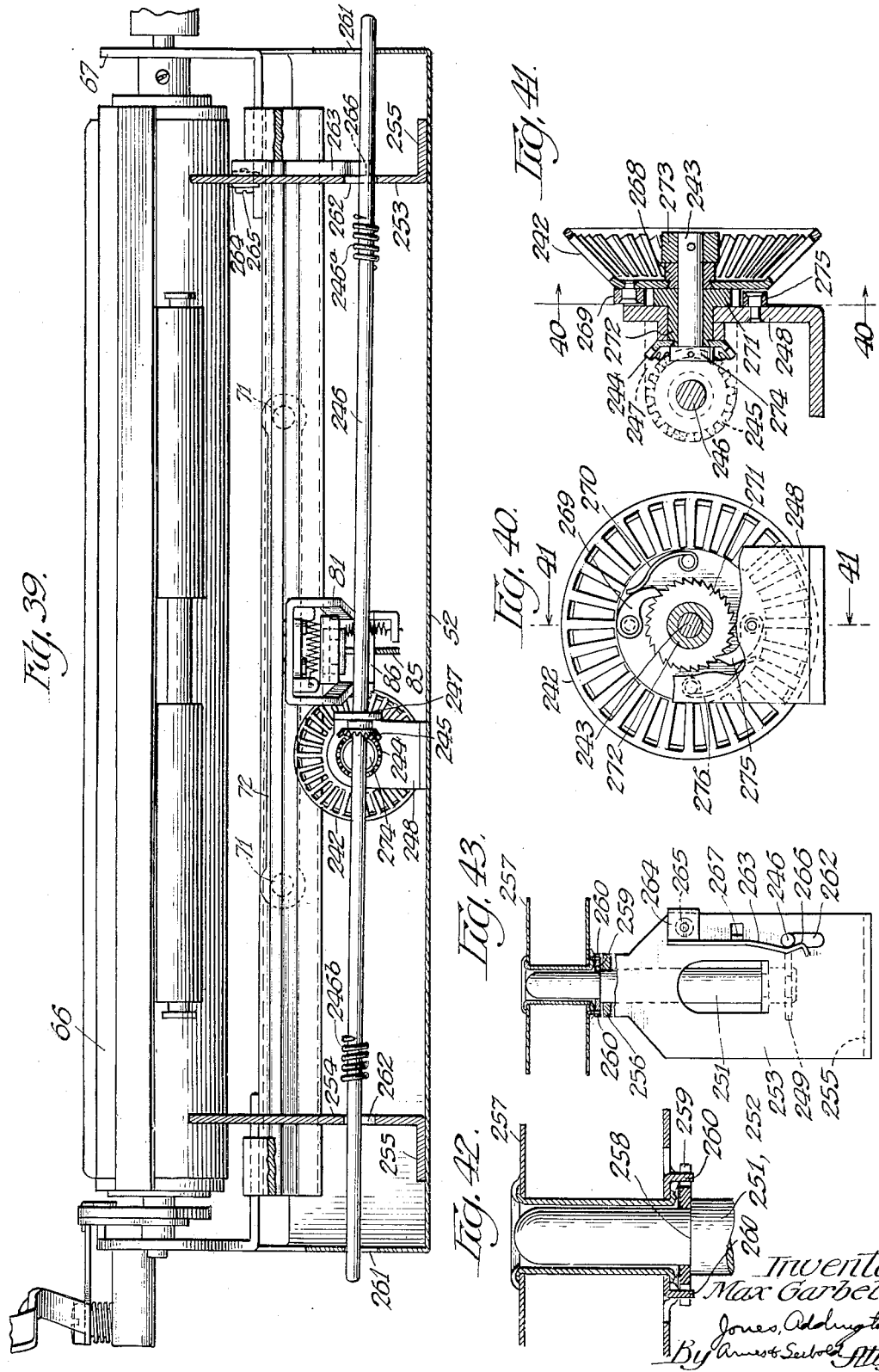

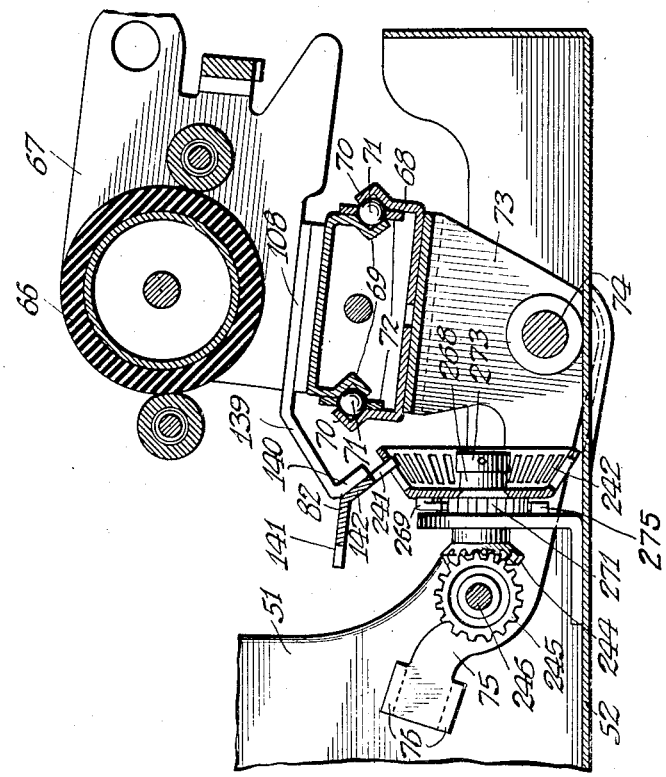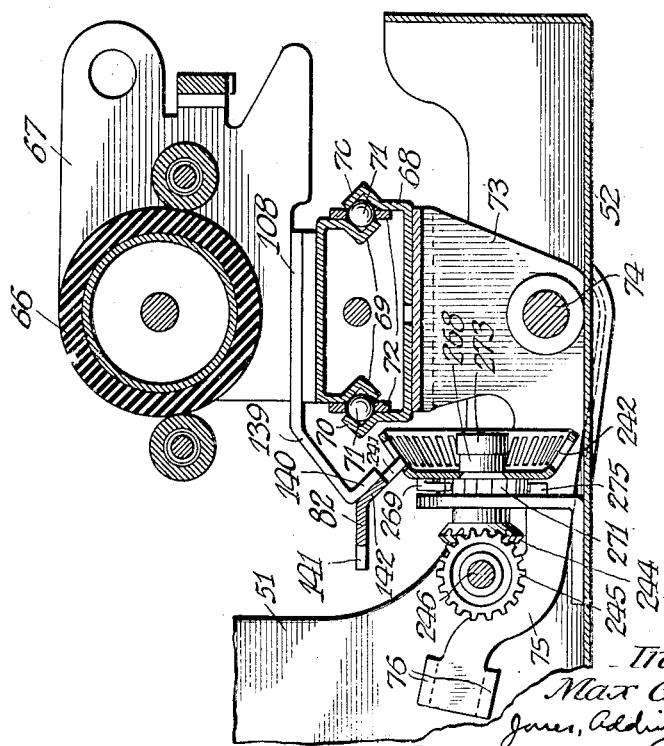

Patented Jan. 12, 1932

1,841,113

UNITED STATES PATENT OFFICE

MAX GARBELL, OF CHICAGO, ILLINOIS, ASSIGNOR TO VICTOR ADDING MACHINE COMPANY, OF CHICAGO, ILLINOIS, A CORPORATION OF ILLINOIS

TYPEWRITING MACHINE

Application filed December 10, 1927. Serial No. 239,015.

My invention relates to typewriting machines and has particular relation to certain improved features that are adapted to be embodied in machines in which the platen and the supporting frame or carriage therefor is pivotally shiftable between case positions, although the application of certain of these features is not limited to machines of this character.

The primary object of my invention, in general, is to provide certain improved forms of carriage shifting and feeding mechanism, and ribbon vibrating and feeding mechanism adapted to be utilized in connection therewith, together with improved forms of universal frame and space bar mechanism and other mechanisms and devices adapted to cooperate with the aforesaid mechanisms.

Another important object of my invention is to provide a machine embodying the above-identified elements, the parts of which are very economical to manufacture and to assemble and are adapted to cooperate to provide a machine of extremely sturdy and reliable construction without sacrificing those refinements which cause the machine to produce work of the highest character and the best appearance.

In pursuance of this and other objects, I have developed the machine hereinafter described, and it will be apparent to those interested in such machines that my invention had reduced the number of total parts utilized, not only in the machine as a whole, but in each of the separable mechanisms or assemblies composing said machine, so that the cost of building the latter is markedly less than has been the case in the past.

Again, I have not only reduced the number of parts, but I have so designed the separable assemblies comprising my novel machine that the elements thereof may be produced by stamping or punching operations, wherefrom a substantial additional economy is effected.

Again, I have in many instances eliminated the various connecting levers and links which have previously been considered essential in order to produce the required movement of the operating parts in a well designed typewriter. In this regard, my machine contemplates, in many places where such involved linkages have heretofore been used, an embodiment of direct contactive connections between operating and operated parts; and it is to the attainment of this latter object that the invention hereinafter described is, in a large measure, directed.

Finally, inasmuch as the typewriting machine hereinafter described is substantially a nonseparable entity,—having regard, of course, for the fact that various assemblies may be utilized in other combinations,—I have not seen fit to split up the description of the mechanism hereinafter described as might have been the case if the various novel assemblies had been separately developed without a view to their ultimate co-relation in an entirely novel machine. In other words, because of the particular and peculiarly novel interconnection and interrelation of the parts, my said machine is not susceptible of description in a number of related applications.

I have found it desirable and, as indicated, even necessary, not only to place properly before the art the machine as an inventive whole but, in order to insure the maximum protection for myself, to describe and claim the machine in as few applications as possible. In pursuance of this policy, I have hereinafter described all of the mechanism of the machine that functions in response to finger strokes and have claimed the same in this application, omitting only specific claims to the type-bar action embodied in said machine, it being my present view that such a separation is not inimicable to my interests. However, I reserve the right to incorporate said description of and claims to the type-bar action in the present application, should I find that the interrelation between the parts is such, when viewed in the light of the prior art, that a splitting of the description into two applications prejudices the patent protection to which my invention is entitled.

Other objects and advantages of my invention will appear from a consideration of the following specification in conjunction with the accompanying drawings, in which:

Figure 1 is a vertical sectional view of a typewriting machine embodying my invention, taken substantially along the center line extending fore and aft of the machine;

Fig. 2 is a perspective view showing a frame for supporting the platen;

Fig. 3 is a perspective view showing the carriage truck upon which the platen frame is mounted to slide transversely of the machine;

Fig. 4 is a perspective view showing a separator adapted to maintain ball-bearings in position between the carriage truck and the platen frame;

Fig. 5 is a top plan view, with parts broken away, showing portions of the case-shift mechanism utilized in my machine;

Fig. 6 is a fragmentary perspective view of a portion of the case-shift mechanism;

Fig. 7 is a view, partly in side elevation and partly in section, showing the case-shift mechanism of my machine in lower case position;

Fig. 8 is a view similar to Fig. 7, but showing the mechanism in upper case printing position with the shift keys locked in said position;

Fig. 9 is a perspective view showing a carriage feeding or escapement mechanism disposed in operative relation to the platen supporting frame and the carriage truck;

Fig. 10 is a fragmentary perspective view showing a portion of the carriage truck bed plate comprising means for supporting the escapement mechanism;

Fig. 11 is a detail perspective view of a slidable member comprising the supporting portion of the escapement mechanism;

Fig. 12 is a detail perspective view, with parts broken away, showing a dog rocker embodied in my escapement mechanism;

Fig. 13 is a detail perspective view showing the slidable supporting member and the dog rocker of the escapement mechanism in their normal relative positions;

Fig. 14 is a detail perspective view showing a movable feed dog embodied in my escapement mechanism;

Fig. 15 is a fragmentary rear elevational view of the escapement mechanism shown in Fig. 9;

Fig. 16 is a fragmentary top plan view of said escapement mechanism;

Fig. 17 is a vertical sectional view taken along the line 17—17 of Fig. 16;

Fig. 18 is a vertical sectional view of the typewriting machine embodying my invention, taken substantially along the center line extending fore and aft of the machine, and showing only such parts as are necessary to understand the operation of the escapement mechanism;

Fig. 19 is an enlarged fragmentary perspective view, with parts broken away, showing the escapement mechanism and portions of the machine frame, universal frame, platen frame, and carriage truck, as seen when looking up at said parts from below;

Fig. 20 is a fragmentary top plan view of the mechanism shown in Fig. 18;

Fig. 21 is a perspective view, with parts broken away, showing the universal frame structure and space-bar mechanism as mounted in the frame of my machine;

Fig. 22 is a fragmentary top plan view of the mechanism shown in Fig. 21;

Fig. 23 is a vertical sectional view taken along the line 23—23 of Fig. 22, and showing the space-bar mechanism in front elevation;

Fig. 24 is a vertical sectional view taken along the line 24—24 of Fig. 22, and showing the space-bar mechanism and a portion of the universal frame structure in side elevation;

Fig. 25 is a fragmentary perspective view showing a stop member utilized in conjunction with the space-bar mechanism;

Fig. 26 is a vertical sectional view taken substantially along the center line extending fore and aft of my machine, and showing only such parts as are necessary to understand the operation of the ribbon vibrating mechainsm which I employ;

Fig. 27 is a detail perspective view of a ribbon carrier utilized in my machine;

Fig. 28 is a detail perspective view of a member constituting both a type-bar guide and a support upon which the ribbon carrier shown in Fig. 27 is slidably mounted;

Fig. 29 is a fragmentary perspective view showing a portion of the type-bar guide and supporting member shown in Fig. 28 in normal position relative to the platen of the machine, and also showing the ribbon carrier shown in detail in Fig. 27 mounted in normal operative relation to said type-bar guide and supporting member, and portions of the vibrating mechanism for said ribbon carrier;

Fig. 30 is a detail perspective view showing a bracket member upon which part of the ribbon vibrating mechanism is supported;

Fig. 31 is a detail perspective view of a type-bar segment, which also constitutes a support for the type-bar guide and ribbon carrier supporting member shown in Fig. 28;

Fig. 32 is a fragmentary sectional view showing the method of mounting the type-bar segment upon the bottom plate of the machine frame;

Fig. 33 is a fragmentary perspective view showing the manner in which the type-bar guide and ribbon carrier operating member is supported by the type-bar segment;

Fig. 34 is a fragmentary perspective view similar to Fig. 29, but showing the ribbon carrier and the vibrating mechanism therefor in the positions assumed by these parts at the instant of impact between a type-bar and the platen, at which instant the ribbon carrier is elevated to position the ribbon between the type-bar and the platen. For the purpose of clarity of illustration, this view does not show the ribbon or a type-bar in contact therewith;

Fig. 35 is a fragmentary top plan view of the mechanism shown in Fig. 26;

Fig. 36 is a vertical sectional view of the machine embodying my invention, taken substantially along the center line extending fore and aft of the machine, and showing only such parts as are necessary to understand the operation of the ribbon feeding mechanism which I employ;

Fig. 37 is a view, partly in rear elevation and partly in vertical section, taken along the line 37—37 of Fig. 36;

Fig. 38 is a top plan view of the mechanism shown in Fig. 36, with the platen and its supporting frame removed;

Fig. 39 is a view, partly in front elevation and partly in vertical section, taken along the line 39—39 of Fig. 38, and showing certain parts broken away;

Fig. 40 is an enlarged detail view, partly in front elevation and partly in section, and with certain parts broken away, showing a portion of the ribbon feeding mechanism which I employ;

Fig. 41 is a vertical sectional view taken along the line 41—41 of Fig. 40, the line 40—40 of this figure designating the line along which the view of Fig. 40 is taken;

Fig. 42 is an enlarged fragmentary vertical sectional view showing the manner in which the ribbon spools are mounted upon vertical posts provided for that purpose;

Fig. 43 is a fragmentary view, partly in side elevation and partly in vertical section, showing the manner in which the supporting posts for the ribbon spools are supported, and also showing a portion of the ribbon feed reversing mechanism which I employ;

Fig. 44 is a somewhat enlarged fragmentary vertical sectional view showing a portion of the ribbon feeding mechanism mounted in operative position with respect to the platen and the supporting frame therefor, which are shown in this view in lower case position; and Fig. 45 is a view similar to Fig. 44, but showing the platen and the supporting frame therefor in upper case position.

In describing the construction and operation of the typewriting machine embodying my invention, reference will first be had to the general assembly of the elements shown in Fig. 1 for the purpose of giving a general understanding of the machine as a whole. The various elements of the machine will thereafter be described in detail with reference to the other drawings, which show such elements individually and in their respective relation to the machine as a whole.

Referring to Fig. 1, it will be seen that the various parts of the machine are enclosed within a casing or frame 51. This casing is preferably constructed of sheet metal punched or stamped into the desired configuration to comprise a bottom plate 52, and front, rear, and side walls formed integral therewith. A top plate 53 comprises an upwardly extending hood-shaped dust shield and type-head guard to protect the type-heads 54 in their normal positions. These type-heads are mounted at the ends of type-bars 55 which are pivotally supported at 56 in a type-bar segment 57. The type-bars comprise segmental gear portions 58 at the lower extremities thereof in rear of the pivot 56. These gear portions are adapted to be engaged individually by rack portions 59 of members 60 that extend to the front of the machine, and are provided with printing keys 61 according to any suitable key-board arrangement.

It will be noted that the members upon which the printing keys are mounted are integral with the portions 59, and that these elements correspond to the pivoted members ordinarily utilized in typewriting machines and referred to as "key levers". For the purpose of maintaining uniformity of terminology, therefore, these members may be referred to hereafter as key levers, but it will be understood that this does not imply that these members are pivoted in any sense, since the movement thereof is strictly rectilinear, as will presently appear.

The key levers 60 are provided at the forward extremities thereof with vertical portions 62, at the upper extremities of which the printing keys 61 are mounted. These vertical portions 62 are guided near their upper extremities for vertical movement by slotted step-like strips 63 that extend transversely of the machine frame and are secured in fixed relation thereto at the sides thereof. The lower extremities of the portions 62 are likewise guided for vertical movement by a horizontal wall or plate 64 that is mounted in spaced relation to the bottom plate 52 of the frame and is provided with slots through which the vertical portions 62 extend. A spiral spring 65 is disposed around the lower part of each of the vertical portions 62 of the key levers and co-acts between the slotted plate 64 and the horizontally extending portion of the key lever to return the same and the associated type-bar to their normal positions after printing operation thereof.

This brief description of the type-bar action of the machine embodying my invention is given in order that a clear understanding of the operation of my entire machine may be had. A more detailed description of this action and its various elements may be had by referring to my co-pending application Serial No. 239,336, filed Dec. 12, 1927, of which this mechanism forms the subject matter.

A platen 66 is suitably supported within a frame or carriage 67 that is mounted upon a shiftable carriage truck 68 for lateral letter-feed movement in the usual manner. The platen frame 67 comprises downwardly extending ball-bearing race-way portions 69 co-operating with upwardly extending race-way portions 70 of the carriage truck 68. Suitable ball-bearings 71 are disposed within the race-ways so formed and are held in proper position therein by separators 72. The platen supporting frame 67 is thus supported upon the carriage truck 68 in such manner that it may be laterally moved therein without any appreciable amount of friction.

The carriage truck 68 is pivotally supported on upwardly extending arms of levers 73 substantially at each end thereof, these levers being secured to a rock shaft 74 that is journaled in the side walls of the machine frame, as will appear more clearly hereafter. The levers 73 also comprise forwardly extending arms 75 that are provided at their forward extremities with outwardly turned lugs 76 which embrace substantially circular portions of shift key levers 77 at the rear extremities thereof.

The shift key levers 77 are fixed to a transverse rock shaft 78, that is supported upon brackets 79 secured to the side walls of the machine frame. The shift key levers extend forwardly from the rock shaft 78 substantially to the front of the machine, at which point they turn upwardly and are provided at their upper extremities with shift keys 80, according to the usual, or any desired, keyboard arrangement. Thus, it will be seen that a very simple case-shift mechanism, comprising only a pair of pivotally mounted shift key levers and a pivotally mounted platen frame, is obtained.

The lateral feeding movement of the platen frame is controlled by an escapement mechanism comprising a dog rocker 81 having fixed and movable dogs adapted alternately to engage a feed rack 82 that is secured to the platen frame. The dog rocker 81 extends from the front of the platen frame, where the rack 82 is located, rearwardly beneath the carriage truck to a point in rear of the platen frame, where it is pivotally supported upon a shaft 83, as will be described in greater detail hereafter.

The dog rocker 81 is adapted to be oscillated about the pivot shaft 83 at each type-bar stroke by means of a universal frame 84 comprising a rearwardly extending arm 85 arranged for contactive engagement with a cross-bar 86 of the dog rocker. The universal frame 84 comprises two arms which extend substantially to the front of the machine in relatively close proximity to the respective side walls thereof, these arms being pivotally supported upon said side walls at points 87. The universal frame is adapted to be depressed at each type-bar stroke by reason of the fact that a cross-bar 88 thereof, constituting what may be strictly termed the universal bar, is arranged to be contacted by the rear extremity of any one of the key levers 60 when the same is depressed for a printing stroke. The universal frame 84 also comprises a cross-bar 89 that is adapted to be depressed by rearwardly extending arms 90 of a space-bar mechanism which may be operated from the key-board of the machine by depressing a space-bar 91.

For the purpose of permitting visible writing on the machine embodying my invention, I provide a ribbon vibrating mechanism of very simple design, comprising a ribbon carrier 92 that is slidably mounted upon an inclined member 93, which also constitutes a guide for the type-bars when the same are actuated for printing engagement with the platen 66. The supporting and guiding member 93 is fixed to the ends of the type-bar segment 57, as will appear more clearly hereafter. An elbow lever or bell crank 94 is supported by a pivot 95 which, in turn, is supported by a bracket 96 that is fixed to the shiftable carriage truck 68 at the lower side thereof, whereby the pivot 95 partakes of the pivotal case-shift movement of the platen and frame therefor.

The bell crank 94 comprises a substantially upwardly extending arm 97 arranged for contactive engagement at its upper extremity with the lower or forward extremity of the ribbon carrier 92, and a rearwardly extending arm 98 that is pivotally connected at its rear extremity with the upper extremity of an L-shaped link 99. From this point, the link 99 extends downwardly and thence rearwardly along the rearwardly extending arm 85 of the universal frame to a point substantially in vertical alignment with the rock shaft 74 of the shift frame, at which point the said link 99 is connected to the arm 85 by a pivot 100.

It will be seen that each depression of the universal frame 84 in response to the depression of one of the printing keys 61 causes the bell crank 94 to be vibrated about its pivot 95 to raise the ribbon carrier 92 and the ribbon carried thereby into printing position between the platen and the descending type head. Since the pivot 95 of the bell crank 94 partakes of the case-shift movement of the platen, it is apparent that when the platen is shifted for upper case printing the ribbon carrier will be elevated a like distance to maintain the same relative position thereof with respect to the platen, thereby ensuring similar operation of the ribbon vibrating mechanism for both lower and upper case printing.

Having now briefly described certain salient features of my invention with particular reference to the manner in which the elements thereof are positioned in the assembled machine, these elements will now be described in detail and dissociated from the mechanism as a whole except insofar as the description of such association is necessary to obtain a clear understanding of the construction and operation of said elements.

*Case-shift mechanism*

The various elements of the case-shift mechanism which I utilize in my typewriting machine are shown in Figs. 2 to 8, inclusive, of the drawings. Fig. 2 shows the details of the platen supporting frame 67. This frame comprises a bottom plate 101, the edges of which are bent downwardly and then into V-shape to form the ball-bearing race-ways 60 heretofore described. End plates 102 comprise upstanding bracket portions 103 and inwardly bent flat portions 104 that are secured to the bottom plate 101 by any suitable means, such as spot-welding, rivets, screws, or the like.

Each of the end plates 102 is provided in its upstanding bracket portion 103 with a hole 105 through which the center shaft of the platen is adapted to extend, whereby the platen may be rotatably supported by the end plates 102. The portion 103 of the left-hand end plate is also provided with a hole 106 for the purpose of supporting a suitable line-spacing mechanism for the platen. An integral inwardly bent lug 107 is provided at the rear of each of the upstanding portions 103 to support a suitable margin-stop rack.

Bracket members 108, as shown in part, are suitably secured to the upper surfaces of the inwardly extending portions 104 of the end plates 102 and extend forwardly therefrom to support a rack member, heretofore described, comprising a portion for cooperating with the carriage feed or escapement mechanism and another portion for actuating the ribbon feeding mechanism.

Bracket portions 109 are struck out and bent downwardly from the bottom plate 101 to provide support for paper feeding mechanism to be disposed between the platen supporting frame 67 and the carriage truck 68. Since this paper feeding mechanism is described and claimed in my co-pending application Serial No. 348,415, filed Mar. 20, 1929, it is not shown or described in detail herein.

The carriage truck 68 is shown in detail in Fig. 3, reference to which will show that this truck comprises a bottom plate 110 secured at its ends to the upper surfaces of outwardly bent portions 111 of the upwardly extending arms of the levers 73. Flat portions 112 integral with the race-way members 70 are suitably secured to the upper surface of the bottom plate 110. As is well known in the art, either or both of these portions may be adjustably mounted for the purpose of affording greater ease of assembly of the machine and also for taking up wear between the cooperating race-way members of the carriage truck and the platen frame. If the provision of such adjusting means is not desired, the members 112 may be permanently fixed to the bottom plate 110 by spot-welding, riveting or in any other suitable manner, and the bottom plate 110 may be secured to the outwardly bent portions 111 of the levers 73 in a similar manner.

I have shown the bottom plate 110 of the carriage truck as comprising a forwardly extending integral arm 113 having a longitudinal slot 114 therein and having a downwardly bent portion 115 at the forward extremity thereof. The L-shaped link 99 passes through the slot 114 and is freely vibratable therein, the function of this slot being merely to provide clearance for said link. The downwardly bent portion 115 is shown as comprising relatively short supporting portions 116 extending outwardly from each side thereof. The bracket member 113 is provided for the purpose of supporting an escapement mechanism, hereinafter described in detail, and further description of this member is not necessary at this time.

The levers 73, the upwardly extending arms of which support the bottom plate of the carriage truck, are provided with sleeve portions 117 which are fixed to said levers and which may be provided with set-screws, pins or other suitable means for securing the levers 73 in fixed relation to the rock shaft 74.

Fig. 4 shows the simple form of separator which I prefer to utilize in my machine. Each of these separators consists simply of a straight bar having slightly enlarged portions at each end thereof, said portions having holes therein adapted to receive the ball-bearings 71. The separators 72 function to maintain two ball-bearings in spaced relation between each of the race-ways 69 and the cooperating raceway 70. Suitable means well known in the art may be provided, if desired, for imparting a predetermined longitudinal movement of the separators 72 within the race-ways, but I find that the provision of such means is not essential to the operation of my machine.

Figs. 5 and 6 show the manner in which the shift keys 80 are disposed at each side of the key-board of the machine and mounted upon the transverse rock shaft 78. The shift levers 77 comprise collar portions 118 through which the shaft 78 extends and pins or set-screws may be provided for securing the shift levers 77 in fixed relation to the shaft 78.

The bracket members 79, by which the shaft 78 is supported, comprise plates fixed to the side walls of the machine frame 51 and having substantially V-shaped depressions in the upper edges thereof to receive the ends of the shaft 78. An inwardly bent lug 119 is provided at the rear portion of each of the bracket members 79 and has a screw-threaded opening therein to receive a screw 120 that is adapted to hold a retaining member 121 in such position as to maintain the rock shaft 78 in the bearing seats provided by the depressions in the upper edges of the bracket members 79.

Bracket members 122, which are suitably secured to the bottom plate 52 of the machine frame at each side thereof, comprise inwardly extending arms 123 and 124 between which the lugs 76 at the forward end of the lever arm 75 may be vibrated. The rear ends of the shift levers 77, and, therefore, the forward ends of the lever arms 75, are normally maintained in their lowermost positions, corresponding to lower case position of the platen, by tension springs 125, the upper extremities of which are connected to the rearwardly extending arms of the shift levers 77 and the lower extremities of which are connected to an upturned lug 126 on the bracket member 122.

The downward movement of the lever arms 75 is arrested by engagement between the arms 123 and the lever lugs 76 in proper position to maintain the platen in its lower case position. Adjustment of this position may be made, if desired, by bending the arms 123 up or down a slight amount, or by providing suitable adjusting means on said arms or lugs. The arms 124 likewise arrest the upward movement of the lever arms 75 to determine the upper case position of the platen, and this position may be adjusted in a manner similar to that described for the adjustment to determine the lower case position.

The rock shaft 74 is rotatably supported at its extremities by bracket members 127 similar to the bracket members 79 by which the rock shaft 78 is supported. Inwardly bent lugs 128 of the bracket members 127 correspond to the lugs 119 of the bracket members 79 and are provided with screw-threaded openings for receiving screws 129 to hold retaining members 130 in position over the ends of the rock shaft 74 in the same manner that the retaining members 121 are held in position over the ends of the rock shaft 78.

It will be observed that the shift key 80 shown in Fig. 6 is mounted at the upper end of a vertical member 131 that is pivotally secured to the forward extremity of the shift lever 77. A tension spring 132 is connected between a lug 133 on the upper edge of the shift lever 77 and a lug 134 on the rear edge of the vertical member 131 at a point above the pivotal connection between this member and the shift lever 77. An integral latch portion 135 is provided on the rear edge of the vertical member 131 relatively close to the lower extremity thereof to permit locking of the platen in its upper case position, as will be presently described.

Fig. 7 of the drawings shows the platen and its associated shifting mechanism in lower case position, and also shows one of the type-heads 54 in contact with the platen in response to the depression of the corresponding printing key 61. It will be observed that the type-head 54 comprises two printing characters 136 and 137, the former of which is a lower case character and the latter an upper case character. The lower case character 136 is in printing contact with the platen when the latter is in its lower case position, as shown in this figure of the drawings.

Fig. 8 shows the platen and its associated shifting mechanism in position for upper case printing, in which the platen is tilted rearwardly about the pivotal mounting of the rock shaft 74 to such an extent that the upper case character 137 of the type-head 54 engages the platen along the same element of its surface that is engaged by the lower case character 136 when the platen is in its lower case position. The platen is shifted to upper case position by depressing either of the shift keys 80, which causes the rear ends of the shift key levers 77 to be lifted and to impart a similar movement to the forward extremities of the lever arms 75. The levers 73 are thus rocked with the shaft 74 to tilt the platen as above described.

In Fig. 8 the latching portion 135 of the vertical member 131 is shown in engagement with a slightly downwardly bent edge 138 of the plate 64, which is provided with a slot through which the lower portion of the member 131 may extend. The latching portion 135 may be actuated into this locking position by exerting a slight forward pressure upon the corresponding shift key 80 when the same is depressed. This pressure need be sufficient only to overcome the tension of the spring 132. If the shift key 80 is depressed vertically without exerting such slight forward pressure thereon, the spring 132 functions to maintain the latching portion 135 out of engagement with the cooperating edge 138 of the plate 64, and the platen and its associated mechanism then remain in upper case position only so long as the shift key 80 is maintained in its depressed position by the operator.

It is obvious that the platen may be allowed to return to its lower case position, after being locked in upper case position, simply by exerting a slight downward and rearward pressure upon the locked shift key 80, which will actuate the latching portion 135 out of engagement with the cooperating edge 138 of the plate 64.

I have shown only one of the two shift keys 80 as being mounted upon a pivotally mounted member 131, the other of said keys being mounted directly upon the upturned forward extremity of the corresponding shift lever 77. This construction is in accordance with usual practice in the art, as means for locking the platen in upper case position is ordinarily provided at only one side of the machine. It will be noted, however, that I have provided for such locking simply by exerting pressure upon one of the shift keys in a slightly different direction from that normally employed, whereas the usual practice in the art is to provide an auxiliary locking key.

From the foregoing description it will be seen that I have provided an extremely simple and effective mechanism for effecting case shift of the platen in the machine embodying my invention. This mechanism comprises, fundamentally, simply two levers of the first class supported by rock shafts pivotally mounted in the frame of the machine. One of these levers constitutes a support for the platen and the other constitutes the shift key itself. A forwardly extending arm of the former lever and a rearwardly extending arm of the latter are operatively disposed with respect to each other. When the shifting mechanism is actuated, these two lever arms cooperate in a rolling action which permits very easy shifting of the mechanism.

Escapement mechanism

This element of my invention is shown in Figs. 9 to 20 of the drawings. Fig. 9 shows the manner in which the dog rocker 81, previously referred to, is mounted to cooperate with the rack 82 to permit letter feeding movement of the platen. It will be seen that the bracket members 108 extend forwardly from the platen frame to support the carriage feed rack 82. The forward extremities of the bracket members 108 are first bent downwardly to form inclined portions 139 and are then bent rearwardly to form downwardly and rearwardly inclined portions 140 to which the rack member 82 is secured. The rack member 82 comprises a substantially horizontal forwardly extending portion 141 and a rearwardly and downwardly inclined portion 142, which latter portion lies against and is fixed to the inclined portions 140 at the forward extremities of the bracket members 108.

The forward end of the dog rocker 81 is adapted to be vibrated about the pivot shaft 83 at the rear of the platen support to effect alternate engagement between fixed and movable dogs on said rocker and the toothed rack member 82. The pivot shaft 83 is supported by upturned lugs 143 at the rear extremity of a slidably mounted member 144. The member 144, which is shown in detail in Fig. 11 of the drawings, comprises a longitudinal slot 145 and two transverse slots 146 and 147. The transverse slots 146 and 147 are provided for the purpose of permitting the member 144 to be slidably mounted on the bracket member 113, heretofore referred to, and a second bracket member 148, both of which bracket members are integral with the bottom plate 110 of the carriage truck.

The bracket member 148 comprises a downwardly extending portion 149 having relatively short outwardly extending arms 150 at each side thereof similar in form to the arms 116 of the downwardly extending portion 115 of the bracket portion 113. The arms 116 and 150 are so spaced and dimensioned as to permit the slidable member 144 to be assembled in juxtaposition to the bottom of the plate 110 by so placing the member 144 that the transverse slots 146 and 147 pass over said arms. The member 144 is then slid backwardly on the arms 116 and 150 in such manner that the downwardly extending portions of the brackets 113 and 148 are received within the longitudinal slot 145 of the member 144.

During the operation of the mechanism the member 144 may be slid forwardly and backwardly on the arms 116 and 150, but the magnitude of this sliding movement is not sufficient to bring these arms into alignment with the transverse slots 146 and 147. It will be understood that these transverse slots are provided simply to permit assembling and disassembling the apparatus and have no function during normal operation of the machine.

The dog rocker 81, which is shown in detail in Fig. 12, comprises two substantially parallel arms 151 that are pivotally mounted at their rear extremities upon the shaft 83 that is supported by the upturned lugs 143 of the slidable member 144. From this pivotal connection the arms 151 extend downwardly and then forwardly and support an integral cross portion 152 at their forward extremities. Another cross portion 86, previously referred to, connects the arms 151 at the lower edges thereof and intermediate their extremities, for the purpose of facilitating vibration of the dog rocker 81 by the universal frame, as will hereafter more clearly appear.

Fig. 13 shows the dog rocker 81 and the slidable member 144 in their normal relative positions, in which the arms 151 of the dog rocker embrace the upturned lugs 143 of the slidable member in such manner as to permit the insertion of the pivot shaft 83 through aligned openings in said lugs and arms. The slidable member 144 comprises, at its forward extremity, an upturned portion 153 having short outwardly extending arms 154 at either side thereof. The distance between the extremities of these short arms is very slightly less than the distance between the inner surfaces of the arms 151 at the forward extremities thereof, and these arms thus provide lateral support for the dog rocker 81.

The horizontal cross portion 152 of the dog rocker 81 comprises a backwardly extending integral dog 155, hereinafter referred to as the fixed dog. Two holes 156 and 157 are also provided in the cross portion 152 and are adapted to receive screws or rivets 158 and 159, respectively, upon which a movable dog 160 is loosely supported directly beneath the lower surface of the cross portion 152.

As shown in Fig. 14, the dog 160 has a substantially L-shaped slot 161 and a substantially straight slot 162 therein. The screws or rivets 158 and 159 extend loosely through the slots 161 and 162, respectively, to permit movement of the dog 160 in a plane parallel to and directly beneath the lower surface of the cross portion 152. A tension spring 163 is connected between a downwardly bent lug 164 of the dog 160 and the inner surface of the right-hand one of the arms 151.

When the escapement mechanism is assembled in its normal position on the bottom of the plate 110, the forward extremity of the dog rocker 81 is biased upwardly by a tension spring 165, as shown in Fig. 18, the lower extremity of this spring being attached to a lug 166 that is bent inwardly from the lower surface of the right-hand one of the arms 151, as best shown in Fig. 12. The upper extremity of the spring 165 is hooked through a hole 165a in the slidable member 144.

When the dog rocker 81 is in its biased position, the movable dog 160 is in engagement with the feed rack 82 to hold the same against the normal feeding force exerted upon the platen frame in letter feed direction. This force may be exerted by any suitable means well known in the art and the illustration of such means in detail herein is not thought to be necessary.

When the universal frame 84 is depressed in response to the actuation of one of the printing keys 61 or of the space bar 91, as heretofore described, the rearwardly extending arm 85 of said frame engages the upper surface of the cross member 86 to depress the dog rocker 81. The dog rocker 81, being pivoted on the shaft 83, moves arcuately, but the extent of this movement about this pivot is so slight as compared with the distance between the pivot shaft and the feed rack that the movement of the fixed and movable dogs is substantially vertical, and, therefore, transverse to the plane of the rack.

As the dog rocker 81 is depressed, the fixed dog 155 is moved into position in front of one of the teeth of the feed rack and the movable dog 160 is moved out of engagement with the tooth by which the platen frame had been held in position prior to the depression of the dog rocker. When the movable dog 160 is thus disengaged from the rack it is retracted by the spring 163, which causes it to slide to the right, as viewed in Figs. 9 and 13 of the drawings, on the screws or rivets 158 and 159.

When the printing key or space bar, whichever has been actuated to depress the universal frame 84, is released, the universal frame is returned to its normal position, as shown in Fig. 18, by a compression spring 167 that is disposed between the rear end of the rearwardly extending arm 85 and the bottom plate 52 of the machine frame. Accidental displacement of the spring 167 is prevented by a finger 168 that is struck out of the bottom plate 52 of the machine frame and bent upwardly to permit the lower end of the spring 167 to be mounted thereon. The rear end of the arm 85 is provided with a downward extension 169 of reduced width that extends into the upper end of the spring 167 to maintain the same in proper position.

When the universal frame 84 is returned to its normal position by the action of the spring 167, the dog rocker 81 is likewise retracted by the spring 165 to cause the fixed dog 155 to disengage the feed rack 82 and to cause the movable dog 160 to be moved in front of one of the teeth of the rack. It will be understood that the tension of the spring 163 is insufficient to offer any appreciable resistance to the movement of the platen frame effected by the feeding means therefor, and that, therefore, the platen frame then moves one letter space under the influence of its feeding means. Such movement is limited at the end of the letter space by the movable dog 160, which is then forced to the limit of its travel on the screws or rivets 158 and 159.

When the platen frame is moved from left to right by the operator, as at the end of a line, the movable dog 160, which is normally in contact with the feed rack 82, is first moved to the right with the rack by reason of the action of the spring 163. The extent of this movement is equal to only about one backward letter space, at the end of which the apex of the L-shaped slot 161 and the left-hand end of the straight slot 162 are in contact with the screws or rivets 158 and 159, respectively.

Further backward movement of the rack 82 causes the inclined rear or right-hand faces of the teeth thereof to exert a camming action on the similarly inclined left-hand face of the tooth of the movable dog 160, thereby moving the left-hand end of said dog forwardly away from the rack about the screw or rivet 159 as a pivot. It is for the purpose of providing clearance for the screw or rivet 158 during such movement that the transverse portion of the L-shaped slot 161 is provided. The extent of this forward movement of the left-hand end of the movable dog 160 is sufficient to permit the teeth of the feed rack 82 to pass freely by the tooth of said dog.

After each tooth of the rack has passed the dog tooth, the left-hand end of the movable dog is moved rearwardly about the screw or rivet 159 as a pivot by the action of the spring 163, which, as will be seen by referring to Figs. 16 and 18, exerts its force in such direction as to bias the dog 160 rearwardly as well as to the right. Therefore, as soon as the operator releases the platen frame to render the feeding means therefor again effective, the dog 160 is in position to cooperate with the rack 82 to hold the platen frame against movement toward the left. The movable dog and the feed rack thus function as a pawl and ratchet, respectively, so far as backward movement of the platen frame is concerned.

For the purpose of permitting the platen frame to be released from the control of the escapement mechanism, I provide an upwardly extending arm 170 at the rear extremity of the slidable member 144. A lug 171 is bent forwardly from the side of said arm at its upper extremity, and a hole 172 in this lug is adapted to receive a release bar 173, as shown in Fig. 9 of the drawings. The release bar 173 extends longitudinally of the platen frame and is pivotally mounted in the upstanding portions 103 of the end plates 102 of said frame.

The main portion of the bar 173 is off-set from the pivoted extremities of the bar by crank portions 174, which also serve to prevent longitudinal displacement of the bar by reason of the fact that they are provided in relatively close proximity to the inner surfaces of the upstanding plate portions 103. A release member 175 is fixed to the off-set portion of the release bar 173 near the right-hand end thereof and extends above the platen frame, as shown in Fig. 18, to permit normal operation thereof.

Reference to this figure will show that when the releasing member 175 is pulled forwardly, the off-set portion 173 of the release bar is also moved forwardly to slide the entire escapement mechanism, comprising the slidable member 144 and the dog rocker 81, toward the front of the machine. This movement actuates the movable dog 160, which, as already stated, is normally in engagement with the feed rack 82, out of engagement with said rack to permit the platen frame to be moved laterally of the machine free from the control of the escapement mechanism.

When the releasing member 175 is permitted to return to its normal position, the escapement mechanism is moved back into its normal position by the force of a tension spring 176, which is best shown in Fig. 19. This spring is connected at its rear end to a lug 177 that is integral with the downwardly extending portion 149 of the bracket 148, which, as shown in Fig. 10 and previously described, is integral with the bottom plate 110 of the carriage truck 68. The forward end of the spring 176 is connected to a lug 178 that is bent downwardly from the slidable member 144. The spring 176 therefore exerts a baising force on the slidable member 142 to maintain it in its rearmost position except when it is actuated out of this position in response to manipulation of the releasing member 175.

From the foregoing description, it will be seen that the escapement or carriage feeding mechanism which I employ permits feeding of the platen frame in letter space direction a distance of one letter space in response to each depression of one of the printing keys 61 or of the space bar 91. To accomplish this result the dog rocker is vibrated transversely of the feed rack at each type-bar or space-bar stroke to cause the movable and fixed dogs to engage the feed rack alternately. When it is desired that the platen frame be freed from the action of the normal feeding mechanism, however, the entire escapement mechanism may be readily moved out of its normal position to cause both the movable and fixed dogs to be actuated out of the positions in which they may engage the feed rack.

*Space-bar mechanism*

This mechanism is shown in detail in Figs. 21 to 25 of the drawings. Referring to these figures, it will be observed that the space bar 91 extends transversely of the machine at the front of the key-board, according to the usual practice. The space bar 91 is supported by inwardly bent portions 179 of vertical supporting members 180 that are integral with the rearwardly extending arms 90 heretofore referred to. As shown in Fig. 23, the space bar 91 may be secured to the supporting portions 179 by screws 181, or any other suitable securing means may be utilized if desired.

Outwardly bent portions 182 of the vertical members 180 extend from the lower extremities of said vertical members and the rearwardly extending arms 90 are bent off substantially at right angles to said portions 182. The arms 90 extend through vertical slots 183 in the front and rear vertical supporting portions of the key lever guide plate 64, heretofore referred to, whereby the rear extremities of the arms 90 may contact with the upper edge of the cross-member 89 of the universal frame 84 to depress the latter when the space bar 91 is depressed.

The vertical supporting members 180 are guided for vertical movement by slots in the front portion of the top plate of the machine frame, and by aligned slots in an intermediate supporting plate 184 that extends transversely of the machine frame and is secured by screws 185 and 186 to the front wall of the machine frame and to the top surface of the plate 64, respectively.

The space bar 91 and the supporting members therefor are further guided and supported by pivoted cross-arms 187 and 188. These arms are supported at their lower extremities on pins 189 and 190, respectively, which, in turn, are supported by lug-portions 191 and 192 that are struck out and bent upwardly from the bottom plate 52 of the machine frame. The arms 187 and 188 are pivotally connected at their middle points by a pin 193 upon which a stop member 194 is also pivotally mounted.

The upper extremities of the arms 187 and 188 engage pins 195 and 196 carried by lugs 197 and 198 that are bent inwardly from the left-hand and right-hand space-bar supporting members 180, respectively, near the lower extremities thereof. The openings in the ends of the bars 187 and 188, through which the pins 189, 190, 195 and 196 extend, may be slightly elongated along the longitudinal axis of the bars to permit free movement of the bars about these points, but the ordinary looseness of the parts will usually be sufficient to permit the necessary slight endwise movement of the bars when the same are depressed.

The space bar 91 and its associated mechanism is normally held in the uppermost position thereof by a tension spring 199, the upper extremity of which is hooked through a hole in a lug 200 that is struck out and bent downwardly from the top plate of the machine frame, and the lower extremity of which is hooked through a hole in the stop member 194 in vertical alignment with the pivot pin 193 and the lug 200. Both the stop member 194 and the spring 199 extend through a suitable slotted aperture 203 in the plate 184.

It will be observed that the stop member 194 is of substantially Y-form and that the pivoted pin 193 extends through the vertical leg of this member. The lower extremity of this vertical leg is bent forwardly at substantially right angles to the main portion of the stop member, and a cushioning member 201, such as a section of rubber tubing or the like, is disposed around this portion to contact with the upper surface of the bottom plate 52 of the machine frame when the space bar is depressed.

Similar cushioning members 202 are disposed around forwardly bent portions at the extremities of the two upwardly extending arms of the stop member 94 and are adapted to contact with the under surface of the top plate of the machine frame when the space bar is in its uppermost position. This construction provides cushioning of the space bar action at both extremities of its movement to ensure a quiet and easy action.

The operation of the space-bar mechanism will be apparent from the foregoing description of its construction. The movement of the space bar itself is always exactly rectilinear, regardless of where the operator may touch the same to depress it, since the bars 187 and 188 always maintain parallel movements of the two supporting members 180. The cross-bar 89 of the universal frame 84 is thus engaged by both of the rearwardly extending arms 90 at each depression of the space bar, to ensure uniform depression of the universal frame at both sides thereof. Such depression results in a corresponding, but greater, depression of the rearwardly extending arm 85 of the universal frame to effect vibration of the escapement mechanism and consequent letter feed of the carriage, as heretofore described.

*Ribbon vibrating mechanism*

The general features of construction and operation of the ribbon vibrating mechanism will be understood from the brief description thereof which has already been given herein. This mechanism is shown in detail, however, in Figs. 26 to 35 of the drawings, to which reference will now be had.

In the general assembly shown in Fig. 26, the entire ribbon vibrating mechanism is shown in its normal position in relation to the cooperating parts of the machine. Fig. 27 shows the construction of the ribbon carrier 92 in detail, and reference to this figure will show that this member comprises a body portion 204 from either side of which a slotted arm 205 extends in the plane of the body portion. Longitudinal slots 206 are provided in these arms to receive the ribbon, which may be inserted in proper position within said slots by passing the same through transverse openings 207 that are cut through the outer walls of the slots 206 in accordance with usual practice.

Integral lugs or ears 208 extend upwardly at substantially right angles to the body portion 204 of the ribbon carrier, and the upper extremities of these lugs or ears are bent inwardly to form portions 209 extending a short distance substantially parallel to the plane of the body portion 204. The body portion 204 converges toward its extremity opposite to that at which the arms 205 are provided, and this narrowed extremity of the body portion is bent upwardly to form an inclined portion 210 and is then bent again to form a portion 211 parallel to the plane of the body portion 204.

This portion 211 has short arms 212 integral therewith and extending outwardly therefrom. These arms lie in substantially the same plane as the inwardly bent portions 209 of the ears 208, above described. An aperture 213 is provided substantially in the middle of the portion 211 and is adapted to receive the upper extremity of the upwardly extending arm 97 of the bell crank 94 by means of which the ribbon carrier is vibrated.

Fig. 28 shows, in detail, the construction of the member 93 which constitutes the type-bar guide and also the support on which the ribbon carrier 92 is slidably mounted. The member 93 comprises a center portion 214 and supporting arms 215 extending outwardly in opposite directions therefrom. The arms 215 are suitably bent or otherwise formed to comprise suitable inclined portions 216 that are adapted to fit into the ends of the type-bar segment 57. Holes 217 are provided in the inclined portions 216 to receive screws or other suitable means for securing the member 93 to the type-bar segment.

The middle portion 214 of the member 93 comprises two arms 218 which extend rearwardly of the machine in the plane of the middle portion 214 and from which two fingers 219 extend inwardly with their extremities properly spaced and provided with suitably raised and rounded portions 220 on the upper surfaces thereof to form a guide for the type heads 54 when the letters are actuated into engagement with the platen at printing strokes.

An open-ended slot 221 extends from the lower or forward extremity of the middle portion 214 toward the opposite extremity thereof to provide a guide for the ribbon carrier 92, the main body portion 204 of which is adapted to lie in juxtaposition to the under surface of the middle portion 214 of the member 93. When the ribbon carrier 92 is so assembled with the member 93, the inclined portion 210 thereof extends upwardly through the slot 221 in the member 93 and the short arms 212 at the lower extremity of the ribbon carrier are adapted to lie upon the upper surface of the middle portion 214 of the member 93 along the edges of the slot 221. The inwardly bent portions 209 of the integral ears 208 provided on the ribbon carrier 92 then embrace the outer edges of the middle portion 214 of the member 93 to complete the slidable support for the ribbon carrier on said member.

This assembly is shown in detail in Fig. 29, which also shows the manner in which the upper extremity of the upwardly extending arm 97 extends through the opening 213 provided therefor in the lower or forward extremity of the ribbon carrier 92.

The bracket 96, which supports the bell crank 94 for vibrating the ribbon carrier, is shown in detail in Fig. 30. Reference to this figure will show that the member 96 comprises a substantially horizontal base portion 222 at the lower and rear extremity of said member, said base portion lying against and being suitably secured to the under surface of the bottom plate 110 of the carriage truck, as shown in Fig. 26 of the drawings.

The main portion of the bracket 96 is bent upwardly from the base portion 222 and is inclined forwardly therefrom. An integral arm 223 extends outwardly from the side of this main portion and the outer extremity of this arm is bent at substantially right angles thereto to form a pivoted supporting portion 224 having a hole 225 therein for receiving and supporting the pivot pin 95 upon which the bell crank 94 is mounted, as previously set forth.

A second integral arm 226 extends outwardly from the main portion of the bracket member 96 and provides a rest for the upwardly extending arm 97 of the bell crank 94 when the latter is in its normal unvibrated position. This rest is formed by bending the arm 226 twice at right angles, thus forming a portion 227 lying in a vertical plane substantially the same as the plane of the pivot-supporting portion 225, and a second portion 228 constituting the actual rest. Said rest extends outwardly from the portion 227 in a plane substantially parallel to that of the main portion of the bracket member 96 and in a position directly forward of that occupied by the front edge of the arm 97 when the latter is in its foremost or unvibrated position.

The upper and forward extremity of the bracket member 96 is bent rearwardly to form a supporting lug 229 lying in a plane inclined to the horizontal. This lug has a hole 230 therein to receive a screw or other suitable securing means for supporting a platen scale 231, as shown in Fig. 26. This platen scale extends upwardly and rearwardly from the support provided by the lug 229 to lie in juxtaposition to the surface of the platen near the printing point. Additional support for the scale 231 may be provided if desired, in the form of a second bracket 96a mounted similarly to the bracket 96 and spaced laterally therefrom, as indicated in Fig. 35.

Fig. 31 shows the construction of the type-bar segment 57, which comprises an arcuate portion 232 having radial slots therein to receive the type-bars in the usual manner. Upright supporting portions 233 are provided at the ends of the arcuate portion 232 and supporting feet 234 extend rearwardly from these upright portions. The under surfaces of the feet 234 are flat and when disposed on the upper surface of the bottom plate 52 of the machine frame determine the proper position of the type-bar segment in the machine assembly. The segment is preferably integrally die-cast of relatively light metal to obviate the necessity of machining the same to any considerable extent.

The detail view of Fig. 32 shows the manner in which the segment is secured to the bottom plate 52. Referring to this figure, it will be observed that depressions 235 are provided in the under surfaces of the feet 234 and that these depressions cooperate with upwardly pressed dowel portions 236 of the bottom plate 52 to locate the segment exactly in its proper position. The dowel portions 236 are of inverted cup-form and have holes therein through which screws 237 extend to engage aligned screw-threaded openings in the feet 234 to secure the type-bar segment firmly to the bottom plate 52 of the machine frame. Bosses 238 may be provided on the upper surfaces of the feet 234 to provide sufficient thickness of material to be engaged by the screws 237 and to ensure the proper strength of the member.

The upper extremities of the upright portions 233 of the type-bar segment are provided with indented surfaces 239 against which the inclined supporting portions 216 of the type-bar guide and ribbon carrier supporting member 93 are adapted to lie, this portion of the assembly being shown in part in Fig. 33. Screws 240 extend through the holes 217 in the portions 216 to secure the member 93 in fixed relation to the type-bar segment 57.

From the foregoing description of the construction of the ribbon vibrating mechanism which I utilize, it will be understood that the member 93, upon which the ribbon carrier 92 is slidably mounted, is stationary and independent of the case position of the platen. The bracket member 96, upon which the bell crank 94 is mounted, however, is fixed to the shiftable carriage truck. When the platen is shifted to upper case position, therefore, the bracket 96 maintains the pivot 95, upon which the bell crank 94 is mounted in constant position relative to the platen.

During such shifting the lower and rear extremity of the L-shaped link 99 pivots about the pin 100 carried by the rearwardly extending arm 85 of the universal frame, thereby causing the rear extremity of the rearwardly extending arm 98 of the bell crank 94 to move in an arc about the pin 100. Since the pin 100 is disposed substantially in vertical alignment with the rock shaft 74 about which the platen pivots when shifted, and since the distance between centers of the rock shaft 74 and the pin 100 is relatively slight, the movement of the bell crank 94 is substantially equivalent to a bodily movement thereof about the axis of the rock shaft 74 as a center. The relative positions of the ribbon carrier 92 and the platen 66 are, therefore, maintained substantially constant.

This condition is essential in order that the ribbon vibrating mechanism may function with equal effectiveness when the platen is in either case position. Since the link 99 is simply moved slightly about the pivot 100 when the platen is shifted to upper case position, the operative condition of the ribbon vibrating mechanism is, obviously, unchanged. A depression of the universal frame 84 in response to a printing stroke is equally effective to rock the bell crank 94 about its pivot 95 to effect the proper vibration of the ribbon carrier 92 and the ribbon carried thereby.

The views of Figs. 29 and 34 illustrate the relative positions of the ribbon carrier and the vibrating mechanism therefor in normal and printing positions, respectively. These relative positions are substantially the same for either lower or upper case operation, since, as already described, the relative positions of the operating parts are the same in either case. In the normal position of the ribbon vibrating mechanism, as shown in Fig. 29, it will be noted that the ribbon carrier is in such position as to render the printing line on the platen clearly visible by the operator, since the upper extremity of the ribbon carrier is below and in front of this line.

When a printing key is depressed, however, the ribbon carrier is actuated upwardly along the slidable support formed by the member 93 into the position shown in Fig. 34, in which the ribbon is thrown into position between the advancing typehead and the printing line on the platen. This operation is brought about by the depression of the universal frame 84 in response to the depression of a printing key, whereupon the arm 84 of said frame pulls the link 99 downwardly to rock the bell crank 94 about its pivot 95. The upwardly extending arm 97 of the bell crank 94 is, therefore, moved rearwardly of the machine and its upper extremity imparts the proper degree of movement to the ribbon carrier 92 along its slidable mounting on the member 93.

After each type-bar stroke, the universal frame and the entire ribbon vibrating mechanism are returned to their normal positions by the lifting motion of the compression spring 167 on the rear extremity of the rearwardly extending arm 85 of the universal frame.

*Ribbon feeding mechanism*

The ribbon feeding mechanism which I prefer to employ in my machine is shown in Figs. 36 to 45 of the drawings. This mechanism comprises, in general, two ribbon spools mounted upon vertical shafts at either side of the machine, and a transverse feeding shaft adapted to be manually actuated into driving engagement with either of the ribbon spool shafts. The transverse feeding shaft is intermittently rotated through a gear train actuated by a rack attached to the laterally movable platen frame and extending longitudinally of said frame. Letter feed movement of the platen, therefore, effects corresponding movement of the rack member, which movement is transmitted through said gear train and feed shaft to either desired one of the ribbon spools to cause the printing ribbon to be wound up thereon, as is customary in the art.

Referring to the drawings, it will be seen that the rearwardly and downwardly extending portion 142 of the rack member 82 is provided with teeth 241 which engage a bevel gear wheel 242 journaled upon a horizontal shaft 243, the axis of which extends fore and aft of the machine. A bevel pinion 244 that is also journaled upon the shaft 243 and is operatively connected to the bevel gear wheel 242 by a one-way clutch mechanism, hereinafter described, operatively engages a second bevel pinion 245 that is fixed to a feed shaft 246 extending transversely of the machine and loosely journaled in a lug 247 that is bent forwardly from a bracket member 248.

The bracket member 248 is fixed to the bottom plate 52 of the machine frame and also supports the bevel gear wheel 242, the pinion 244 and certain associated mechanism, as will be hereinafter described in greater detail.

The shaft 246 is provided with two worm portions 246a and 246b between the bevel pinions 245 and the respective extremities of said shaft. I have shown each of these worm portions as consisting of a wire wound around the shaft 246 at the proper position and secured to such shaft in any suitable manner, as by welding or soldering.

The worm portions 246a and 246b are adapted to engage worm wheels 249 and 250 that are mounted at the lower extremities of ribbon spool shafts 251 and 252, respectively. These ribbon spool shafts are supported by bracket members 253 and 254 comprising horizontally extending base portions 255, whereby said bracket members are fixed to the bottom plate 52 of the machine frame. Horizontally extending and vertically spaced lug portions 256 are bent inwardly from each of the bracket members 253 and 254 to constitute journals for the ribbon spool shafts.

The upper extremities of the ribbon spool shafts comprise reduced diameter portions having substantially hemispherical ends to facilitate the placing of the ribbon spools 257 thereon. Shoulder portions 258 that are formed on the ribbon spool shafts by the said reduced diameter portions support collar members 259 having peripheral indentations therein to receive lugs 260 that extend downwardly from the bottom plates of the ribbon spools 257. The rotation of the ribbon spool shafts is thus imparted to the corresponding spools to effect winding of the ribbon thereon in the customary manner.

To permit alternate winding of the ribbon on the respective spools, the transverse feed shaft 246 is so mounted that it may be tilted by manipulating the ends of this shaft, which ends extends through vertically slotted apertures 261 in the opposite side walls of the machine frame. The shaft 246 also extends through vertically slotted apertures 262 in the bracket members 253 and 254, which provide guides for the shaft in its shifting movement and support the same in either of its normal positions.

A resilient member in the form of a flat spring 263 comprises a bent off and doubled over supporting portion 264 that embraces one edge of the supporting bracket 253, to which it is secured by a screw 265. The spring 263 extends downwardly along the outer surface of the bracket member 253 and is bent at its lower extremity to form a V-shaped portion 266, the apex of which is disposed substantially at the middle of the slotted aperture 262 in the bracket member 253.

The apex of this V-shaped portion overlies the slot 262 to such an extent that one of the inclined side portions thereof engages the shaft 246 in each of its shifted positions. Accidental displacement of the shaft 246 is thus precluded, and said shaft is firmly maintained in its desired position by reason of the biasing action of the spring 263. The extent to which the V-shaped portion 266 of the spring 263 may overlie the slot 262 is limited by a lug 267 that is struck out and bent outwardly from the bracket member 253 between the extremities of the spring member 263. This lug engages the spring member to prevent the application of too great a frictional force thereby upon the surface of the shaft 246 when the same is in either of its operative positions, but permits obtaining a relatively strong biasing effect from the spring member 263 when the shaft 246 tends to move out of either of its operative positions.

Since the transverse feed shaft 246 is adapted to be rotated always in the same direction by the mechanism about to be described, the direction in which the ribbon spool shafts 251 and 252 are positively driven is always the same. The ribbon may be wound from either spool onto the other, however, by actuating the feed shaft 246 into such of its operative positions that the proper one of the worm portions 246a and 246b engages the corresponding worm wheel 249 or 250 connected to the spool upon which it is desired that the ribbon shall be wound up.

It will be observed that when either end of the shaft 246 is manually depressed, the worm portion nearer that end is actuated out of engagement with its co-operating worm wheel and the worm portion nearer the opposite end of the shaft is actuated into engagement with its wheel. The direction of feed of the ribbon may be reversed from either end of the shaft by either depressing or lifting that end. When the shaft 246 is thus moved to reverse the direction of ribbon feed, it is also slightly moved in the loose journal support 247 therefor in such manner as to maintain proper driving relation between the bevel pinions 244 and 245 at all times. Since the journal support 247 is relatively close to the axis of rotation of the bevel pinion 244, this relation may be maintained by providing only a very slight looseness in the journal 247.

Figs. 40 and 41 show the details of construction of the mechanism connecting the bevel gear wheel 242 and the bevel pinion 244. The former is fixed to a hub portion 268 that is loosely mounted upon the shaft 243. A feed dog 269 is pivoted to the front face of the gear wheel 242 and is held by a flat spring 270, which is also fixed to said face, in co-operative engagement with the toothed periphery of a ratchet wheel 271. This ratchet wheel comprises a hub portion 272 extending through a journal support provided by the upstanding bracket member 248, and the bevel pinion 244 is fixed to said hub portion in front of said bracket member. The entire assembly is maintained against displacement longitudinally of its axis by collar members 273 and 274 that are pinned to the respective extremities of the shaft 243.

A holding dog 275 is pivotally mounted on the rear face of the bracket member 248 in juxtaposition to the ratchet wheel 273 and is held in co-operative engagement with said wheel by a flat spring member 276 that is mounted on the same face of the bracket member. Since the hub portions 268 and 272 are both loosely journaled upon the shaft 243, it will be apparent that the only driving connection between the bevel gear wheel 242 and the pinion 244 is that constituted by the feed dog 269 and the ratchet wheel 271.

Rotation of the ratchet wheel in the reverse of normal direction is positively prevented by the holding dog 275, which is mounted upon the fixed bracket member 248 as above described. Therefore, when the wheel 242 is rotated in a clockwise direction, as viewed in Fig. 40, the ratchet wheel 271 and the bevel pinion 244 that is fixed thereto are rotated therewith. When the wheel 242 is rotated in the reverse direction, or counter-clockwise as viewed in Fig. 40, the ratchet wheel 271 and the pinion 244 are held stationary by the holding dog 275 and the feed dog 269 passes idly backwardly over the teeth of the ratchet wheel.

This construction ensures positive feed of the ribbon in the direction determined by the position of the transverse feed shaft 246 and prevents operation of the ribbon feeding mechanism when the platen is moved from left to right, that is, in the reverse of letter feeding direction.

In the specific construction which I prefer to utilize, the bevel gear wheel 242 consists simply of a hollow shell having interdental openings punched or otherwise provided therein. When the mechanism is assembled in the machine the teeth 241 of the ribbon feeding portion of the rack member 82 extend through these interdental openings to constitute an operative gear and rack connection.

The angle of inclination of the bevel face of the wheel 242 is such that when the platen and its supporting frame are shifted between case positions the teeth 241 of the ribbon feeding portion of the rack member 82 that are in engagement with the wheel 242 slide longitudinally of the interdental openings in the face of said wheel. The relative positions of the rack and wheel for lower and upper case positions of the platen are shown in Figs. 44 and 45, respectively.

While the tooth portions 241 of the ribbon feeding rack engage the teeth formed by the openings in the face of the wheel 242 at different distances from the axis of rotation of said wheel in the different case positions of the platen, the rack teeth 241 are of such contour as to permit a certain degree of looseness between the rack and wheel, whereby adjacent teeth of the rack will always enter adjacent interdental openings in the wheel as it is moved transversely of the machine frame with the platen.

I wish it to be understood, however, that my invention is not limited to the use of a bevel gear wheel to be engaged by the ribbon feeding rack and to drive the ribbon feeding mechanism, as I also contemplate the provision of a straight spur gear journaled upon a shaft inclined at such an angle that the elements of the face of said spur gear will lie substantially parallel to the direction of movement of the ribbon feeding rack when the platen is shifted. The use of the bevel pinions 244 and 245 renders such construction very easy of accomplishment, since driving connection between these pinions may be made at any desired angle radially of the shaft 246. This particular feature of my invention resides broadly in the provision of such construction as to permit maintaining constant driving relation between a shiftable element and a nonshiftable element of the ribbon vibrating mechanism.

I wish to point out particularly the novel and beneficial arrangement whereby a single rack member 82 is provided, at one edge thereof, with teeth for co-operating with the escapement or carriage feeding mechanism, and, at the other edge thereof, with teeth for actuating the ribbon feeding mechanism. This provides a very economical and reliable construction, which I believe to be entirely new and claim broadly herein.

While I have shown and described only one specific embodimtnt of my invention, I wish it to be understood that numerous changes and modifications may be made in the details of construction and assembly thereof, without departing from the spirit and scope of my invention, as set forth in the appended claims.

I claim:

1. In a typewriting machine, a platen, a frame on which said platen is mounted for movement transversely of the machine, a rack member mounted to move with the platen, a supporting member carried by said frame and slidable thereon fore and aft of the machine, a dog rocker pivotally mounted on said supporting member and carrying dogs to co-operate with said rack member, and means for sliding said supporting member on said frame to actuate said dogs out of co-operative engagement with said rack member.

2. In a typewriting machine, a platen, a frame on which said platen is mounted for movement transversely of the machine, a rack member mounted to move with the platen, a supporting member carried by said frame and slidable thereon fore and aft of the machine, a dog rocker pivotally mounted on said supporting member and carrying a fixed dog and a movable dog, means for vibrating said dog rocker to cause said dogs to engage said rack member alternately, and means for sliding said supporting member on said frame to actuate said dogs out of co-operative relation with said rack member.

3. In a typewriting machine, a platen, a frame on which said platen is mounted for movement transversely of the machine, a rack member mounted to move with the platen, a supporting member carried by said frame and slidable thereon fore and aft of the machine, a dog rocker pivotally mounted on said supporting member and carrying a fixed dog and a movable dog, means for vibrating said dog rocker to cause said dogs to engage said rack member alternately, means operable in response to the actuation of a printing key for vibrating said dog rocker to cause said dogs to engage said rack member alternately, and means for sliding said supporting member on said frame to actuate said dogs out of co-operative relation with said rack member.

4. In a typewriting machine, a platen, a frame on which said platen is mounted for movement transversely of the machine, a rack member mounted to move with the platen, a supporting member carried by said frame and slidable thereon fore and aft of the machine, a dog rocker pivotally mounted on said supporting member and carrying a fixed dog and a movable dog, means for vibrating said dog rocker to cause said dogs to engage said rack member alternately, means comprising a universal member for vibrating said dog rocker to cause said dogs to engage said rack member alternately, and means comprising a release bar for sliding said supporting member on said frame to actuate said dogs out of co-operative relation with said rack member.

5. In a typewriting machine, an escapement mechanism comprising a dog-rocker, a universal member constituting a lever of the third class pivoted substantially at the front of the machine and lying substantially entirely in a single horizontal plane near the bottom of the machine and comprising a portion in direct contactive relation to said dog rocker for actuating the same.

6. In a typewriting machine, a universal member comprising a substantially quadrangular loop portion, forwardly extended pivotally supported arms secured to two sides of said loop portion and a rearwardly extending actuating arm secured to a third side of said loop portion, and space-bar mechanism comprising a member contactive with the fourth side of said loop portion.

7. In a typewriting machine, a universal member comprising a substantially quadrangular loop portion, forwardly extending pivotally supported arms secured to two sides of said loop portion and a rearwardly extending actuating arm secured to a third side of said loop portion, printing-key-actuable members contactive with said third side of said loop portion, and space-bar mechanism comprising a member contactive with the fourth side of said loop portion.

8. In a typewriting machine, a space bar, a pair of cross-arms each having one end pivotally supported on a fixed part of the machine and its other end pivotally connected to the space bar, a pivotal connection between said arms substantially at the mid-points thereof, and a stop member carried by said pivotal connection.

9. In a typewriting machine, a space bar, a pair of cross-arms each having one end pivotally supported on a fixed part of the machine and its other end pivotally connected to the space bar, a pivotal connection between said arms substantially at the mid-points thereof, a substantially Y-shaped stop member carried by said pivotal connection, and resilient means at the extremities of said stop member for contacting with fixed portions of the machine to limit the movement of the space bar in two directions.

10. In a typewriting machine, a space bar, a pair of cross-arms each having one end pivotally supported on a fixed part of the machine and its other end pivotally connected to the space bar, a pivotal connection between said arms substantially at the mid-points thereof, a substantially Y-shaped stop member carried by said pivotal connection, resilient means at the extremities of said stop member for contacting with fixed portions of the machine to limit the movement of the space bar in two directions, and a tension spring connected between substantially the center of said stop member and a fixed part of the machine to bias the space bar toward a normal inoperative position.

In witness whereof, I have hereunto subscribed my name.

MAX GARBELL.